(12) United States Patent
Kim

(10) Patent No.: US 11,325,245 B2
(45) Date of Patent: May 10, 2022

(54) ROBOT

(71) Applicant: LG ELECTRONICS INC., Seoul (KR)

(72) Inventor: Moonchan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 16/452,062

(22) Filed: Jun. 25, 2019

(65) Prior Publication Data
US 2019/0389056 A1    Dec. 26, 2019

(30) Foreign Application Priority Data

Jun. 25, 2018  (KR) .................. 10-2018-0073023

(51) Int. Cl.
| | | |
|---|---|---|
| *B25J 9/10* | (2006.01) | |
| *B25J 13/06* | (2006.01) | |
| *B25J 9/12* | (2006.01) | |
| *B25J 13/00* | (2006.01) | |
| *G06F 3/0484* | (2022.01) | |
| *H04R 1/02* | (2006.01) | |

(52) U.S. Cl.
CPC .............. *B25J 9/102* (2013.01); *B25J 9/126* (2013.01); *B25J 13/006* (2013.01); *B25J 13/06* (2013.01); *G06F 3/0484* (2013.01); *H04R 1/028* (2013.01)

(58) Field of Classification Search
CPC ....... B25J 9/10; B25J 9/12; B25J 13/00; B25J 13/06
See application file for complete search history.

(56) References Cited

U.S. PATENT DOCUMENTS

| | | | |
|---|---|---|---|
| 4,806,069 A | 2/1989 | Telldén | |
| 2005/0246065 A1* | 11/2005 | Ricard | G01S 17/86 700/258 |
| 2011/0167946 A1 | 7/2011 | Kim et al. | |
| 2011/0240007 A1* | 10/2011 | Currier | F24S 30/452 126/606 |
| 2012/0197439 A1 | 8/2012 | Wang et al. | |

(Continued)

FOREIGN PATENT DOCUMENTS

| | | |
|---|---|---|
| DE | 3310210 | 10/1984 |
| KR | 10-0996404 | 11/2010 |

(Continued)

OTHER PUBLICATIONS

Korean Office Action dated Dec. 10, 2019 issued in KR Application No. 10-2018-0073023.

(Continued)

*Primary Examiner* — Kira Nguyen
(74) *Attorney, Agent, or Firm* — KED & Associates LLP

(57) ABSTRACT

A robot includes a base, a first body provided above the base, a first gearing configured to rotate the first body about the base, a second body provided above the first body, a second gearing configured to tilt the second body about a tilting axis, an interface installed in at least one of the first body and the second body, a first gear mounted on the second body and tilted together with the second body, and a damper mounted on the first body. The damper includes a damping gear engaged with the first gear, and the first gear is tilted along an outer circumference of the damping gear.

18 Claims, 14 Drawing Sheets

(56) References Cited

U.S. PATENT DOCUMENTS

| | | | | |
|---|---|---|---|---|
| 2016/0188977 A1* | 6/2016 | Kearns | ............... | G05D 1/0274 |
| | | | | 348/113 |
| 2016/0228314 A1* | 8/2016 | Tamai | .................. | B25J 5/007 |
| 2016/0303740 A1* | 10/2016 | Wang | ................... | B25J 9/1697 |
| 2017/0001490 A1* | 1/2017 | Park | ................... | A47L 11/4072 |
| 2017/0242478 A1 | 8/2017 | Ma | | |
| 2018/0200893 A1* | 7/2018 | Taguchi | ............... | B25J 13/085 |
| 2018/0304457 A1* | 10/2018 | Hutson | ................ | B25J 9/102 |
| 2018/0370557 A1* | 12/2018 | Chen | ................... | F16H 19/04 |

FOREIGN PATENT DOCUMENTS

| | | |
|---|---|---|
| KR | 10-2014-0040094 | 4/2014 |
| KR | 10-1452438 | 10/2014 |
| KR | 10-2017-0097581 | 8/2017 |

OTHER PUBLICATIONS

European Search Report dated Jan. 3, 2020 issued in EP Application No. 19181887.1.

* cited by examiner

ROBOT

CROSS-REFERENCE TO RELATED APPLICATION(S)

The present application claims priority under 35 U.S.C. 119 and 35 U.S.C. 365 to Korean Patent Application No. 10-2018-0073023, filed in Korea on Jun. 25, 2018, which is hereby incorporated by reference in its entirety.

BACKGROUND

1. Field

The present disclosure relates to a robot.

2. Background

Robots are machines that may automatically process given tasks or operate with their own capabilities. The application fields of robots are generally classified into industrial robots, medical robots, aerospace robots, and underwater robots. Recently, communication robots that can communicate with humans by voices or gestures have been increasing.

Communication robots may provide users with visual information or auditory information and may three-dimensionally move while being panned or tilted. An example of such a communication robot is disclosed in Korean Patent Application Publication No. 10-2014-0040094 A (published on Apr. 2, 2014), whose disclosure is hereby incorporated by reference in its entirety.

The communication robot may include a head supporting an interfacing module, a neck, and a body. The robot may further include a rotator rotating the head relative to the body, and a tilter tilting the head by a predetermined angle relative to the body independently of the rotator. The tilter may include a tilter motor moving the head in an angle range of +/−90 degrees with respect to Z axis.

BRIEF DESCRIPTION OF THE DRAWINGS

Embodiments will be described in detail with reference to the following drawings in which like reference numerals refer to like elements, and wherein.

DETAILED DESCRIPTION

Figure 1:
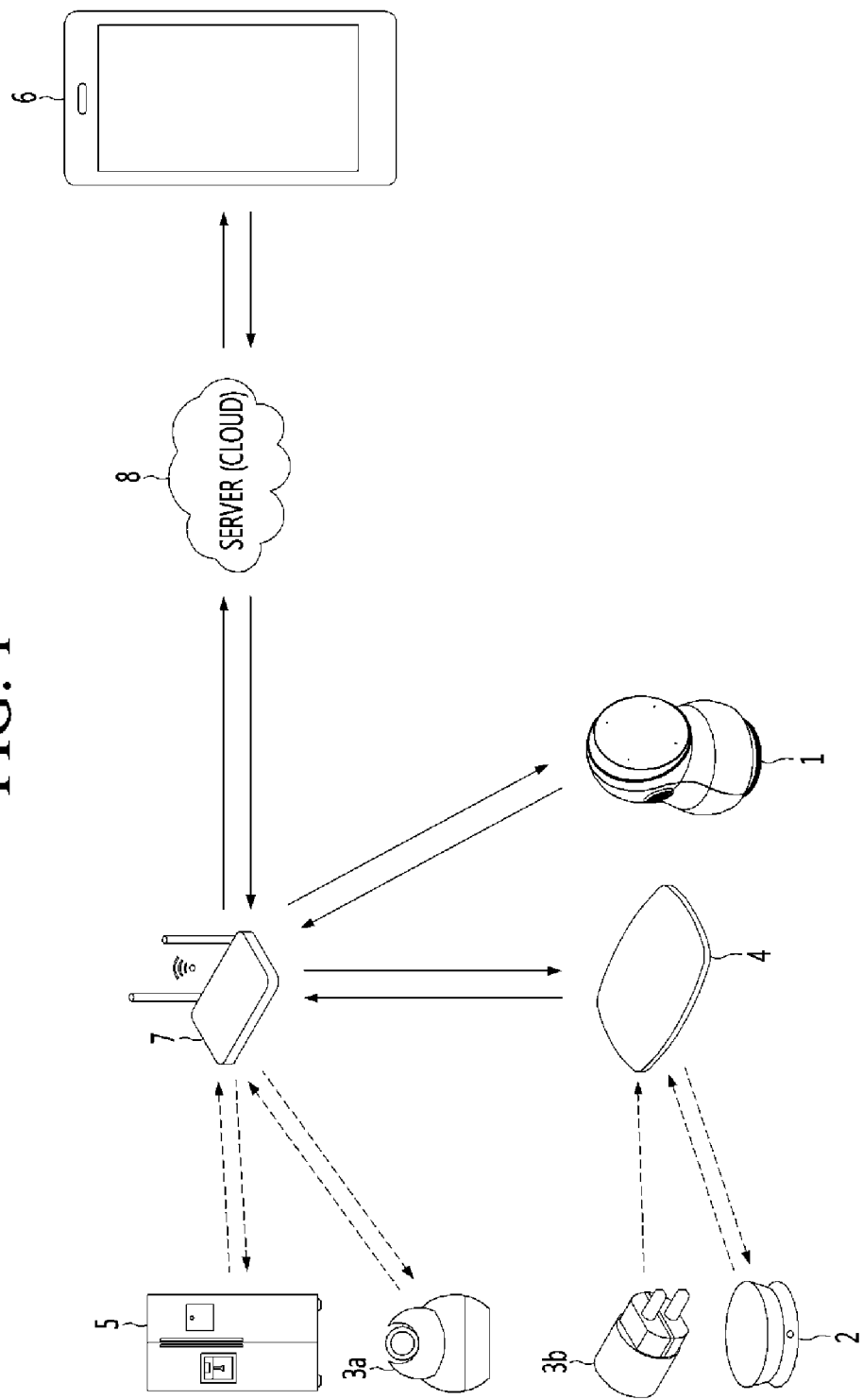
FIG. 1 illustrates an example of a network system to which a robot according to an embodiment is applied.

As illustrated in FIG. 1, a network system may include a robot 1 that transmits information via a wired network or a wireless network, accessories 2, 3a, and 3b, a gateway 4, a terminal 6, an access point 7, and a server 8. The network may be established based on technologies such as Wi-Fi, Ethernet, Zigbee, Z-wave, or Bluetooth. The robot 1, the accessories 2, 3a, and 3b, the gateway 4, and the access point 7 may include a communication module connectable to the network according to a predetermined communication protocol.

A communication module included in each of the devices 1, 2, 3a, 3b, 4, and 7 constituting the network system may be determined according to the configuration of the network, and a plurality of communication modules may be provided in the device according to a communication method between each device and the network or between the devices.

The robot 1 may be connected to the access point 7 via a wired (e.g., Ethernet) or wireless (e.g., Wi-Fi) communication. Communication between the robot 1 and the accessories 2 and 3b may be achieved via the gateway 4 and the access point 7. As another example, communication between the robot 1 and the accessory 3a or between the other devices 5 may be achieved via the access point 7.

A signal transmitted from the accessories 2 and 3b may be transmitted to the robot 1 via the gateway 4 and the access point 7 in sequence, and a signal transmitted from the robot 1 may be transmitted to the accessories 2 and 3b via the access point 7 and the gateway 4 in sequence. As another example, a signal transmitted from the accessory 3a or other device 5 may be transmitted to the robot 1 via the access point 7, and a signal transmitted from the robot 1 may be transmitted to the accessory 3a or other device 5 via the access point 7.

For example, information acquired by sensor modules of the accessories 2, 3a, and 3b may be transmitted to the server 8, the terminal 6, or the robot 1 via the network. In addition, a signal transmitted from the server 8, the robot 1, or the terminal 6 so as to control the sensor module, a control module, or a remote control module may be transmitted to the accessory 2. The transmission of such signals may be performed via the gateway 4 and/or the access point 7.

Communication between the accessories 2, 3a, and 3b and the robot 1 may be possible just by the gateway 4 and the access point 7. For example, even when a home network is disconnected from an external communication network such as the Internet, communication between the accessories 2, 3a, and 3b and the robot 1 may be possible.

When the robot 1 is connected to the server 8 via the access point 7, information transmitted from the robot 1 or the accessory 2 may be stored in the server 8. The information stored in the server 8 may be received by the terminal 6 connected to the server 8.

The information transmitted from the terminal 6 may be transmitted to the robot 1 or the accessory 2 via the server 8. A smart phone, which is a recently widely used terminal, may provide a convenient user interface (UI) based on graphics. It may then be possible to control the robot 1 and/or the accessory 2 via the UI or to process and display information received from the robot 1 and/or the accessory 2. In addition, functions that can be implemented through the robot 1 and/or the accessory 2 may be extended by updating applications installed on the smartphone.

The terminal 6 and the robot 1 may directly communicate with each other regardless of the server 8. For example, the robot 1 and the terminal 6 may directly communicate with each other by using a Bluetooth scheme.

It may also be possible to control the accessory 2 or display and process the information received from the accessory 2 with the robot 1 alone, without using the terminal 6. The network system may be configured without the gateway 4, and the robot 1 may also function as the gateway 4.

The accessories 2, 3a, and 3b may include at least one communication module for connection with the network. The communication module may communicate with a predetermined network.

The accessories 2, 3a, and 3b may include a sensor module that detects a predetermined ambient environment. The accessories 2, 3a, and 3b may include a control module that performs a specific function that affects the surrounding environment. The accessories 2, 3a, and 3b may include a remote control module that transmits an optical signal (for example, an infrared signal) for controlling a predetermined peripheral device.

The accessories 2, 3a, and 3b with the sensor module may be devices including a pressure sensor, a humidity sensor, a temperature sensor, a radiation detection sensor, a heat detection sensor, a gas detection sensor, an air quality sensor, an electronic nose sensor, a healthcare sensor, a biometric sensor, a sleep sensor (for example, the sleep sensor may be attached to a user's pajamas or underwear to detect snoring, apnea, tossing, etc. while the user is sleeping), a proximity sensor, an illuminance sensor, an acceleration sensor, a magnetic sensor, a gravity sensor, a gyroscope sensor, a motion sensor, an RGB sensor, an infrared (IR) sensor, an ultrasonic sensor, a remote sensor, an SAR, a radar, and a light sensor (for example, a video sensor, an image sensor, etc.).

The accessories 2, 3a, and 3b with the control module may include smart lighting for controlling illumination, a smart plug for controlling application and degree of power, a smart temperature regulator for controlling the operation and intensity of a boiler or an air conditioner, and a smart gas lock for controlling shutoff of gas. The accessories 2, 3a, and 3b with the remote control module may include an infrared LED or the like for emitting an IR signal to a remote controllable household appliance or the like.

The accessories (for example, 3a and 3b) may be installed only for the purpose set to perform a predetermined performance. For example, the accessory 3a may be a video camera, and the accessory 3b may be a smart plug.

The accessory 2 according to the embodiment may be installed at any position desired by the user. In addition, the accessory 2 may be utilized for various purposes. For example, the accessory 2 may be attached to an external object such as a household appliance, a door, a window, or a wall.

The gateway 4 may mediate communication between one or more accessories 2 and 3b and the access point 7. The gateway 4 may communicate with the accessory 2 by wireless. The gateway 4 may communicate with the access point 7 by wire or wireless. For example, the communication between the gateway 4 and the access point 7 may be based on Ethernet or Wi-Fi.

The access point 7 may be connected to the server 8 via wired or wireless communication. The server 8 may be connected via the Internet. The access point 7 may communicate with the server 8 through various terminals 6 connected to the Internet. The terminal 6 may be a mobile terminal such as a personal computer (PC) or a smart phone.

The accessories 2 and 3b may communicate with the gateway 4. As another example, the accessory 3a may directly communicate with the access point 7 without passing through the gateway 4. The access point 7 may directly communicate with the accessory 3a or other device 5 equipped with the communication module without passing through the gateway 4. These devices 5 and 3a may be provided with a Wi-Fi communication module so as to directly communicate with the access point 7 without passing through the gateway 4.

Figure 2:
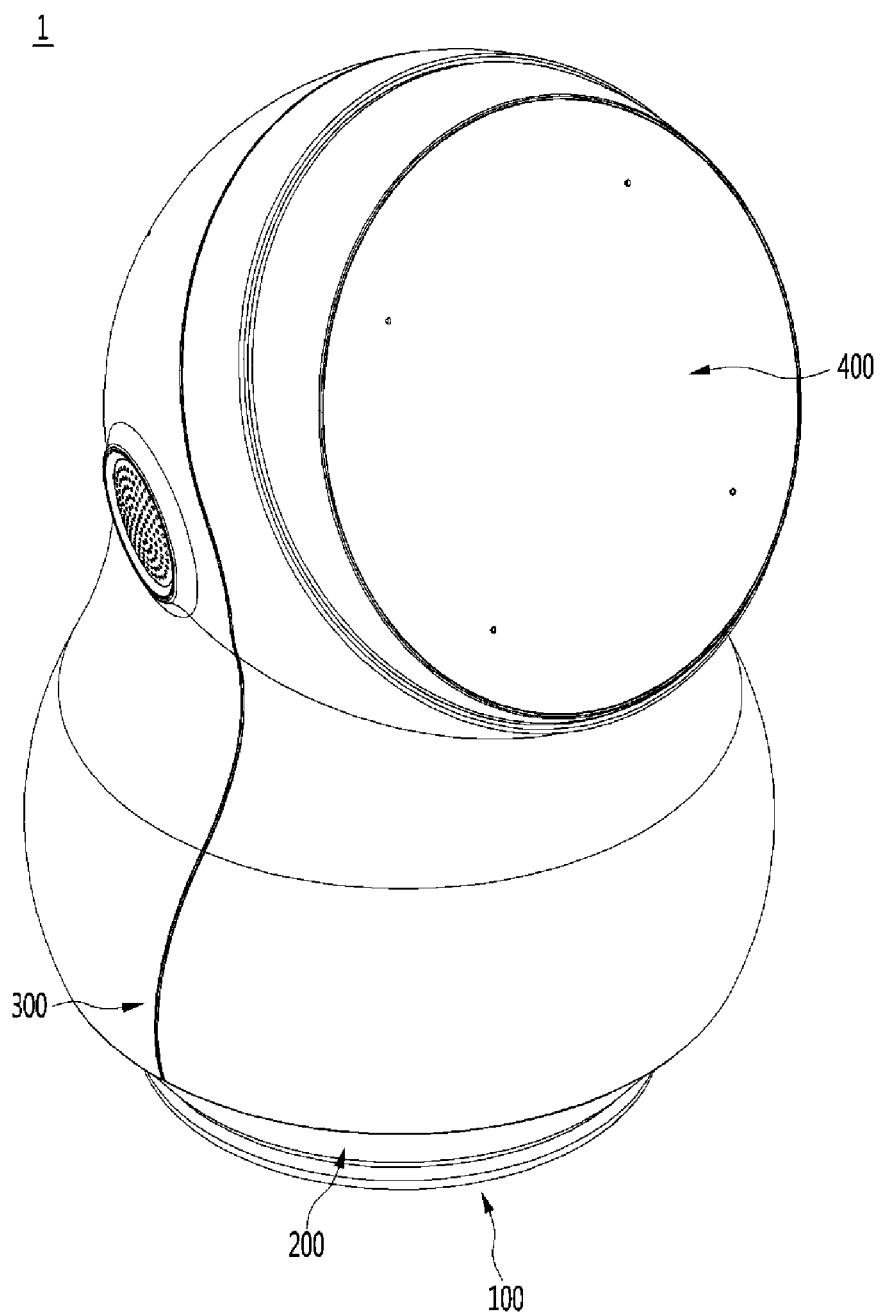
FIG. 2 is a perspective view of a robot according to an embodiment.
Figure 3:
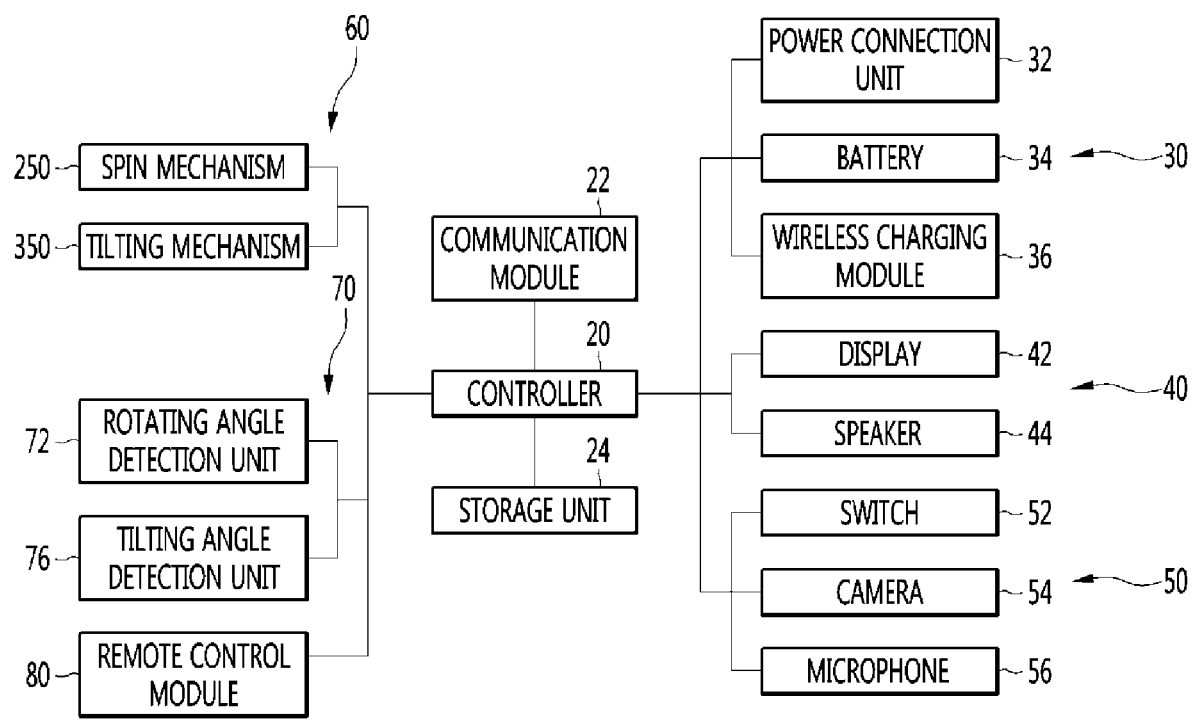
FIG. 3 is a control block diagram of the robot according to the embodiment.
Figure 4:
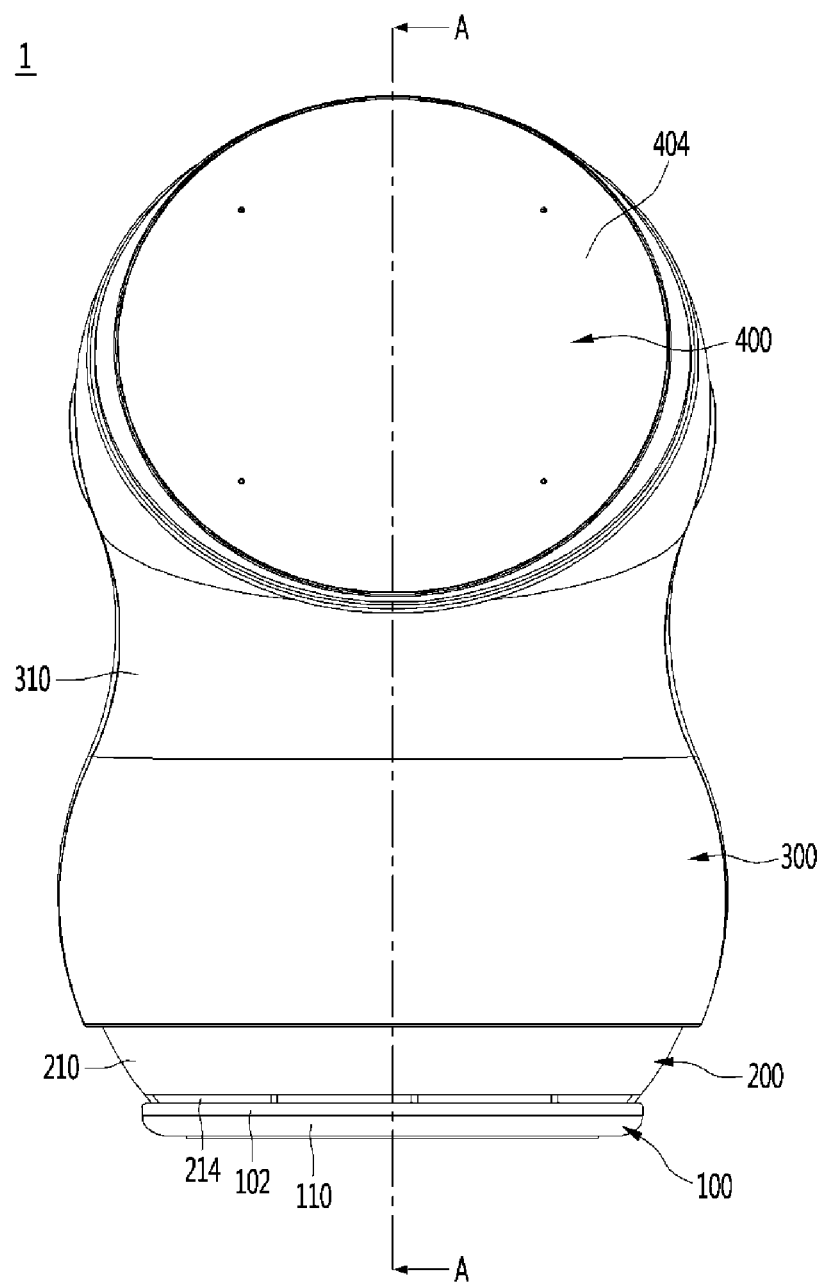
FIG. 4 is a front view of the robot according to the embodiment.
Figure 5:
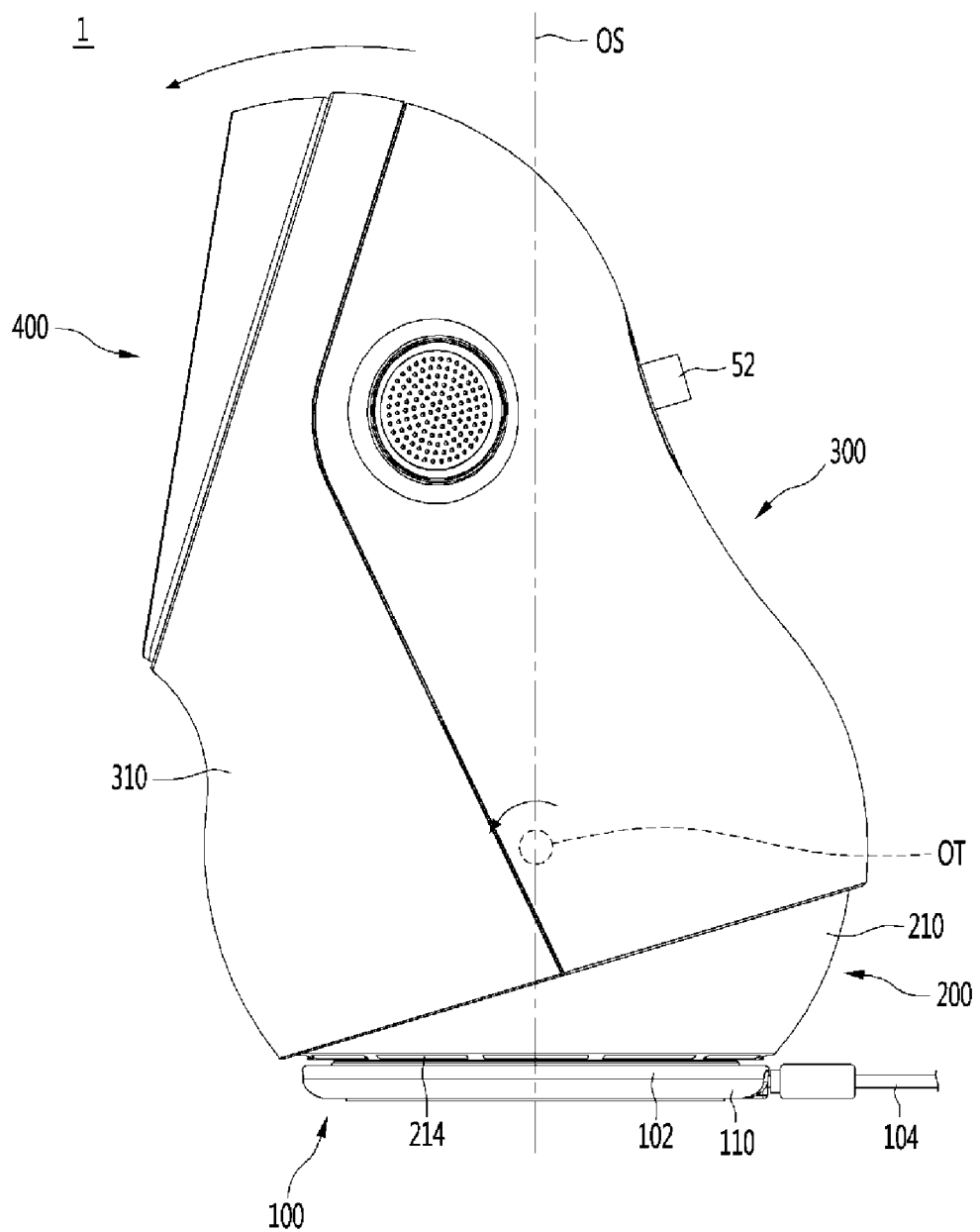
FIG. 5 is a front view illustrating a state in which a tilting body according to an embodiment is tilted forward.
Figure 6:
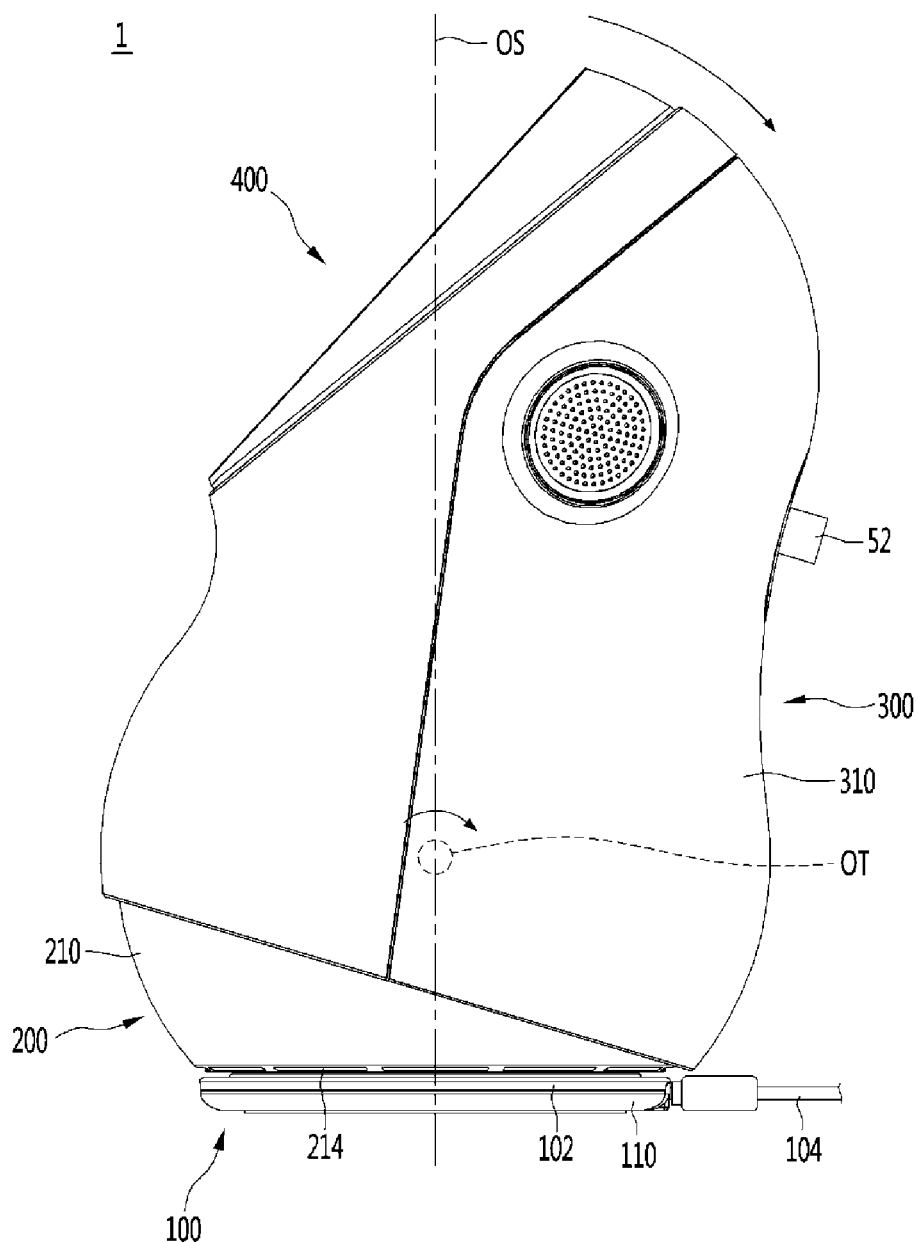
FIG. 6 is a front view illustrating a state in which the tilting body according to the embodiment is tilted rearward.

As illustrated in FIGS. 2 and 3, the robot 1 according to the embodiment may include a base 100, a spin or first body 200 rotatably provided on the base 100, a tilting or second body 300 supported on the spin body 200 so as to be able to be tilted about a tilting axis, and at least one interface 42, 44, 54, and 56 provided in at least one of the spin body 200 or the tilting body 300.

The robot 1 may include a controller 20 for controlling the robot 1. The controller 20 may be provided in the server 8 or the terminal 6 so as to control the robot 1 through the network.

The robot 1 may include a communication module 22 for communicating with the network. The communication module 22 may include a Wi-Fi module, a Bluetooth module, a Zigbee module, and a Z-wave module. The communication module 22 may be changed according to a communication scheme of a device to be directly communicated. The communication module 22 may communicate with at least one of the access point 7, the gateway 4, the accessories 2, 3a, and 3b, the server 8, or the terminal 6 constituting the network system.

Information acquired from an input unit (or input) 50 through the communication module 22 may be transmitted over the network. Information may be received by the robot 1 on the network through the communication module 22, and the controller 20 may control an output unit (or output) 40 or a driving unit (or drive) 60 based on the received information.

The robot 1 may include a storage unit (or memory) 24 for storing information acquired through a driving detection unit or sensor 70. The memory 24 may store information received from the network through the communication module 22. The memory 24 may store commands from the input 50.

The robot 1 may include a power supply device 30 for supplying power to the respective components of the robot 1. The power supply device 30 may include a power connection portion 32 capable of connecting an external wired power cable. The power connection portion 32 may be implemented by a socket. The power supply device 30 may include a battery 34. The battery 34 may be provided for charging. The power supply device 30 may further include a wireless charging module 36 capable of charging the battery 34.

The robot 1 may include the output 40. The output 40 may output the information visually or audibly to the outside. The output 40 may include a display 42 for visually outputting information. The output 40 may include a speaker 44 for outputting information audibly.

The robot 1 may include the input 50. The input 50 may receive a command for controlling the robot 1. The input 50 may allow a user to directly input a command without passing through the communication module 22. The input 50 may receive a command for controlling the accessory 2.

The input 50 may include a switch 52. The switch 52 may include a power switch for turning on/off the power of the robot 1. The switch 52 may include a function switch for setting the function of the robot 1, pairing with a predetermined network, pairing with the terminal 6, and the like. It may be possible to set various commands to the robot 1 through a combination of the pressing time of the function switch and/or the number of times of continuously pressing the function switch. The switch 52 may include a reset switch capable of resetting a predetermined setting of the robot 1. The switch 52 may include a sleep switch for switching the robot 1 to a power-saving state or a non-output state.

The input 50 may include a camera 54 for sensing an external visual image. The camera 54 may acquire an image for recognizing a user. The camera 54 may acquire an image for recognizing the direction of the user. Image information acquired by the camera 54 may be stored in the memory 24.

The input 50 may include a touch type display. The input 50 may further include a microphone 56 for sensing an external sound. When the robot 1 includes the microphone 56, the controller 20 of the robot 1 may recognize the user's voice input through the microphone 56 and extract a command. In order to recognize the position of the sound source, the input 50 may include a plurality of microphones 56. The sound information acquired by the microphone 56 or the position information about the user may be stored in the memory 24.

The robot 1 may include a direction sensor for sensing the direction of the user with respect to the robot 1. The direction sensor may include the camera 54 and/or the plurality of microphones 56.

The robot 1 may include the drive 60 for performing motion of the robot 1. The robot 1 may give the same feeling as a living creature by performing the motion of the robot 1 together with the output contents of the display 42 of the robot 1 or the output contents of the speaker 44 of the robot 1. Just as gesture (motion) or eye contact play a big role in human-human communication, the motion of the robot 1 by the driving unit 60 may function to efficiently recognize the output contents of the output 40 to the user. The motion of the robot 1 by the drive 60 may add emotional elements in the communication process between the user and the robot 1.

The driving unit 60 may include a plurality of driving units 250 and 350. The plurality of driving units 250 and 350 may be independently driven, or may be simultaneously driven to enable complex motion.

The driving unit 60 may include a spin mechanism 250 for rotating the spin body 200 about the base 100. The spin mechanism 250 may provide power so as to rotate the spin body 200 about the rotational shaft OS extending in the vertical direction with respect to the base 100.

The driving unit 60 may further include a tilting mechanism 350 for tilting the tilting body 300 about the tilting shaft OT. The tilting mechanism 350 may provide power to the spin body 200 such that the tilting body 300 tilts to one side.

The tilting mechanism 350 may provide power so as to rotate the tilting body 300 about the tilting shaft OT. The tilting mechanism 350 may be connected to the spin body 200, and when the spin body 200 is rotated by the spin mechanism 250, the tilting mechanism 350 and the tilting body 300 may rotate together with the spin body 200.

The robot 1 may include a driving detection unit or sensor 70 capable of detecting a current motion state of the driving unit 60. The driving detection unit 70 may include a rotating angle detection unit or sensor 72 that senses a rotating angle of the spin body 200 about the rotational shaft OS. The driving detection unit 70 may include a tilting angle detection unit or sensor 76 that senses a rotating angle (inclined angle) of the tilting body 300 about the tilting shaft OS with respect to the spin body 200.

The controller 20 may control the communication module 22 based on control information received from the input 50. The controller 20 may control the communication module 22 to store the information received from the network in the memory 24. The controller 20 may perform control such that the information stored in the memory 24 is transmitted to the network via the communication module 22.

The controller 20 may receive control information from the input 50. The controller 20 may perform control such that the output 40 outputs predetermined information. The controller 20 may perform control such that the driving unit 60 operates together with the information output by the output 40.

For example, the controller 20 may recognize the user based on the image acquired by the camera 54, and may operate the output 40 and the driving unit 60 based on the recognition. When the recognized user matches a preset user, the controller 20 may display a smile image on the display 42 and operate the tilting mechanism 350 to tilt the tilting body 300 in the vertical or horizontal direction.

As another example, the controller 20 may recognize the face position of the user based on the direction sensor, and may operate the output 40 and the driving unit 60 based on the recognition result. The controller 20 may display predetermined information on the display 42 and operate the spin mechanism 250 such that the display 42 is directed toward the user's face. The controller 20 may perform control such that the spin body 200 rotates so as to switch the image output direction of the display body 400 to the direction of the user detected by the direction sensor.

The controller 20 may control whether to operate the driving unit 60 based on the control information received from the network via the communication module 22. The controller 20 may control the driving unit 60 based on the control information received from the input 50. The controller 20 may control the driving unit 60 based on the control information stored in the memory 24.

The robot 1 may include a remote control module 80. The remote control module 80 may transmit an optical signal (for example, an infrared signal) for controlling a predetermined peripheral device. The predetermined peripheral device may mean a peripheral device capable of remote control. For example, the predetermined peripheral device may be a washing machine, a refrigerator, an air conditioner, a robot cleaner, a TV, and the like, which may be controlled by a remote control module 80. The remote control module 80 may include a light emitting unit for emitting a predetermined optical signal for controlling the predetermined peripheral device.

For example, the light emitting unit may be an LED that emits infrared rays. The direction in which the remote control module 80 irradiates the optical signal may be changed according to the operation of the robot 1. In this manner, the optical signal irradiation direction of the remote control module 80 may be changed in the direction of the specific device requiring the remote control, so as to control the specific device by the optical signal.

The display 42, the speaker 44, the camera 54, and the microphone 56, which constitute the robot 1, may be interfaces for helping communication between a human and the robot 1, these interfaces may be mounted on the spin body 200 and may be rotatable together with the spin body 200 when the spin body 200 rotates, and these interfaces may be mounted on the tilting body 300 and may be tilted together with the tilting body 300 when the tilting body 300 is tilted. In the robot 1, the interfaces such as the display 42, the speaker 44, the camera 54, and the microphone 56 may be distributed in the spin body 200 and the tilting body 300.

The robot 1 may include an interface module 400 including at least one of the interfaces such as the display 42, the speaker 44, the camera 54, or the microphone 56, and the interface module 400 may be mounted on the tilting body 300, may spin together with the tilting body 300 during the rotation of the spin body 200, and may tilt together with the tilting body 300 during the tilting of the tilting body 300. The battery 34, the display 42, the speaker 44, the camera 54, the microphone 56, the spin mechanism 250, the tilting mechanism 350, and the like may be supported to the spin body 200 or the body 300 in consideration of the weights or sizes thereof, and may be arranged such that the entire center of gravity of the robot 1 is minimized.

The base 100 may rotatably support the spin body 200 and may support the loads of the spin body 200, the tilting body 300, and the interface modules 400. Hereinafter, the base 100 will be described in detail with reference to FIGS. 8 and 9.

The base 100 may include a combination of a plurality of members. The base 100 may include a lower base 101, and an upper base 102 provided on the lower base 101. A PCB accommodation space S1 for accommodating a base PCB 103 may be formed in the base 100. The PCB accommodation space S1 may be formed between the lower base 101 and the upper base 102.

The base PCB 103 may be accommodated in the PCB accommodation space S1 formed in the base 100 and may be protected by the base 100. The base PCB 103 may be directly connected to the power connection unit 32 to which the power cord 104 is connected, or may be connected to the power connection unit 32 through a wire.

A light source 103A such as an LED may be disposed in or on the base PCB 103. The base 100 may function as a lighting device, and the base 100 may function as an interface for providing visual information to the outside.

The base 100 may further include a decor member 110 through which light emitted from the light source 103A such as the LED is transmitted. The decor member 110 may be arranged between the lower base 101 and the upper base 102, and light from the light source 103A such the LED may be emitted to the outside through the decor member 110 between the lower base 101 and the upper base 102.

The base 100 may further include a non-skid member 105 provided on the bottom surface of the lower base 101. The non-skid member 105 may be formed in a ring shape or a disk shape, and may be attached to the bottom surface of the lower base 101. The non-slip member 105 may be a non-slip mat having a large frictional force with the ground.

A spin body supporter 106 for rotatably supporting the spin body 200 may be arranged on the base 100. The spin body supporter 106 may be provided on the top surface of the upper base 102.

The spin body supporter 106 may include a lower bearing 107 that contacts the spin body 200. The lower bearing 107 may be rotatably supported by a bearing support portion (or bearing support) 106A formed in the spin body supporter 106. The bearing support 106A may protrude from the top surface of the spin body supporter 106.

The lower bearing 107 may include a rolling bearing 107A having a rolling member such as a ball or a roller disposed between inner and outer rims, and a supporting shaft 107B fixed to the inner rim of the rolling bearing 107A. The support shaft 107B may be rotatably supported by the bearing support portion 106A and may be arranged horizontally.

The outer rim of the rolling bearing 107A may be brought into contact with the spin body 200, particularly, the spin housing 210. When the spin body 200 rotates, the outer rim of the rolling bearing 107A may be rotated about the support shaft 107B arranged horizontally to facilitate smooth rotation of the spin body 200.

A plurality of lower bearings 107 may be provided on the base 100. The plurality of lower bearings 107 may support the spin body 200, particularly, the spin housing 210 in a state of being spaced apart from the base 100. The plurality of lower bearings 107 may be spaced along a virtual circle, and the plurality of lower bearings 107 may transmit the load acting on the spin body 200 to the base 100, particularly, the spin body supporter 106 in a distributed manner.

A weight body W capable of increasing the weight of the base 100 may be provided on the base 100. The weight body W may be an object having a larger weight than a volume, and may reduce the entire center of gravity of the robot 1 as much as possible and help the robot 1 not to overturn. The weight body W may be provided in the spin body supporter 106. The weight body W may be located on the top surface of the spin body supporter 106. A plurality of weight bodies W may be stacked in the vertical direction.

An upper bearing 108 for rotatably supporting the spin body 200 may be provided on the base 100. The base 100 may further include a fixed shaft 109 on which the upper bearing 108 is mounted. The fixed shaft 109 may be the center of rotation of the spin body 200, and the central axis of the fixed shaft 109 may be the spin shaft OS.

The upper bearing 108 may be mounted on the fixed shaft 109 so as to be arranged above the spin driven gear 280 to be described later. The upper bearing 108 may surround the outer circumference of the upper portion of the fixed shaft 109.

The upper bearing 108 may be a rolling bearing arranged between the fixed shaft 109 and a spin cover 220 to be described later. The upper bearing 108 may include an inner rim fixed to the outer circumference of the fixed shaft 109, an outer rim fixed to the upper bearing housing 221 formed in the spin cover 220, and a rolling member such as a ball or a roller disposed between the inner rim and the outer rim.

The upper bearing 108 may be arranged above the spin driven gear 280 and spaced apart from the spin driven gear 280, and may rotatably support the spin cover 220. The shaft center of the upper bearing 108 may be a vertical axis, and the shaft center of the upper bearing 108 may coincide with the spin shaft OS.

The spin driven gear 280 may be mounted on the fixed shaft 109, and the spin driven gear 280 may be mounted on the fixed shaft 109 by a fastening member such as a screw. The spin driven gear 280 may have a double structure of an upper gear and a lower gear, and the upper gear and the lower gear may be fixed to each other. The spin driven gear 280 may guide the spin body 200 to rotate the spin body 200 in a state of being fixedly mounted on the fixed shaft 109. The spin body 200 may be rotated along the locus of the spin driven gear 280.

The fixed shaft 109 may be located above the spin body supporter 106, and may be coupled to the spin body supporter 106 by a fastening member such as a screw. A through-hole (H) through which a wire may pass may be formed in the fixed shaft 109. The through-hole H may pass through the fixed shaft 109 in the vertical direction. The wire or the like passing through the through-hole H of the fixed shaft 109 may connect the base PCB 103 to at least one of a PCB 230 mounted on the spin body 200, a PCB 340 mounted on the tilting body 300, or an interface PCB 406 of the communication module 400.

Hereinafter, the spin body 200 will be described. The spin body 200 may include a spin housing 210 having a space S2 formed therein, and a spin cover 220 covering the space S2.

The interface according to the present embodiment may be accommodated in the space S2 of the spin body 200. The interface accommodated in the space S2 of the spin body 200 may be relatively large and relatively heavy as compared with the other interfaces 42, 54, and 56, for example, the speaker 44 may be accommodated in the space S2 of the spin body 200. However, embodiments are not limited to the case where the speaker 44 is accommodated in the space S2 of the spin body 200, and other interfaces such as the microphone 56, the battery 34, or the PCB 230 may be accommodated in the space S2 of the housing 200. The speaker 44 may be mounted on the tilting body 300.

The interface accommodated in the space S2 of the spin body 200 may be disposed below the spin cover 220, and the interface may include an avoiding portion (or cavity) 43 (see FIG. 7) for avoiding or accommodating a tilting motor 360 to be described later. The cavity 43 may surround part of the tilting motor 360. The cavity 43 may be formed in a recessed shape on the top surface of the interface accommodated in the space S2 of the spin body 200, and the cavity 43 may surround the bottom surface of the tilting motor 360 and the circumferential surface of the tilting motor 360 and may protect the tilting motor 360. The tilting motor 360 may be protected by the spin cover 220, the interface accommodated in the space S2 of the spin body 200, and the spin housing 210.

The space S2 formed in the spin body 200 may be a space in which the interface (for example, the speaker 44) and the tilting motor 360 to be described later can be accommodated together, and the spin housing 210 and the spin cover 220 may function as a protective cover for protecting the interface accommodated in the space S2 and the tilting motor 360. Part of the spin housing 210 may be exposed to the outside. Part of the spin housing 210 may be seen through the lower end of the tilting housing 310 to be described later, and the spin housing 210 may constitute part of the appearance of the robot.

The spin housing 210 may have a shape in which the top surface thereof is opened and the size thereof is reduced downward. The outer surface of the spin housing 210 may be convex toward the outside. The outer diameter D2 of the upper end 210A of the spin housing 210 may be larger than the outer diameter D3 of the lower end 210b of the spin housing 210.

The spin housing 210 may include an upper hollow body 211. The upper hollow body 211 may have a space S2 in which the tilting motor 360 and the interface 44 may be accommodated, and the size thereof may be reduced toward the lower side.

Figure 9:
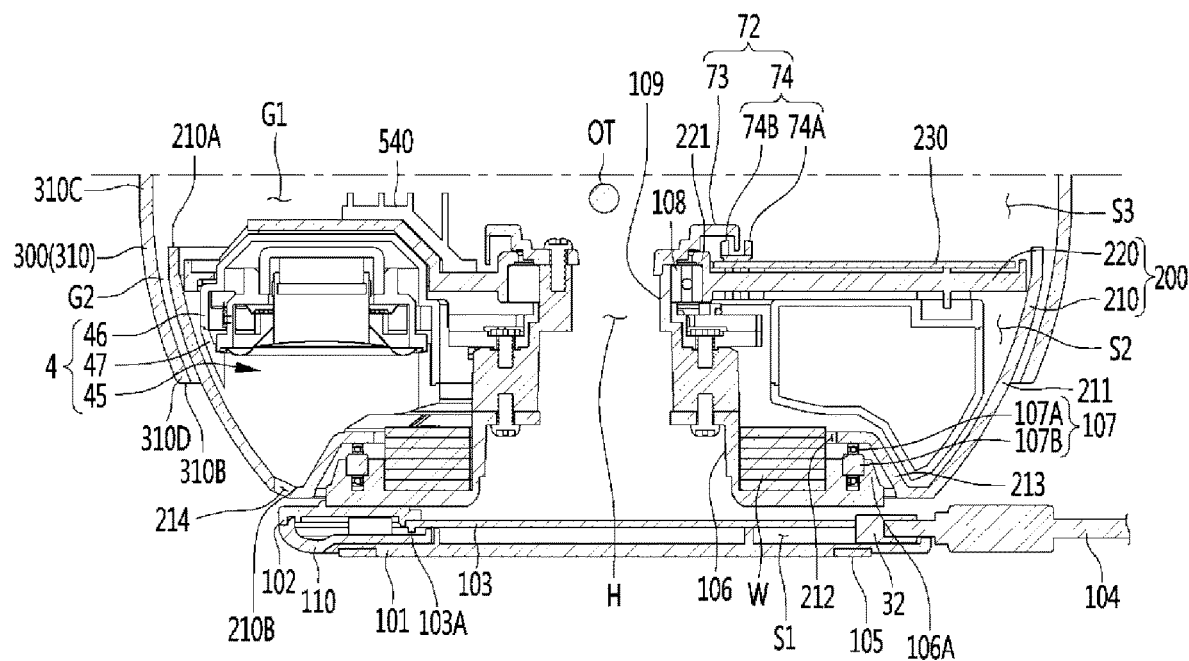
FIG. 9 is an enlarged cross-sectional view of a base according to an embodiment.

The spin housing 210 may further include a lower hollow body 213. The lower hollow body 213 may extend from the lower end of the upper hollow body 211 toward the space S2 formed inside the upper hollow body 211. A base through-hole 212 (see FIG. 9) through which part of the base 100 passes may be formed at the center of the lower hollow body 213. As illustrated in FIG. 9, the lower hollow body 213 may include a shielding body extending such that the lower bearing 107 is hidden from the side, and a contact body extending horizontally from the top of the shielding body and seated on the lower bearing 107. The base through-hole 212 may be formed in a hollow shape in the contact body, and the lower hollow body 213 may be rotated along the plurality of lower bearings 107 in a state in which the bottom surface of the contact body is in contact with the outer rim of the lower bearing 107.

The speaker 44 accommodated in the space S2 of the spin body 200 may include a sound module 45 and sound boxes 46 and 47 connected to the sound module 45. The sound boxes 46 and 67 may include an upper sound box 46 and a lower sound box 47 connected to the lower portion of the upper sound box 46.

When the speaker 44 is accommodated in the space S2 of the spin body 200, the cavity 43 (see FIG. 7) for accommodating the tilting motor 360 may be formed in the sound module among the sound module 45 and the sound boxes 46 and 47. When the sound boxes 46 and 47 include the upper sound box 46 and the lower sound box 47, the cavity 43 may be formed in the upper sound box 46.

The spin housing 210 may include an acoustic hole 214 through which the sound generated from the speaker 44 exits the spin body 200. The acoustic hole 214 may be formed between the upper hollow body 211 and the lower hollow body 213. A plurality of acoustic holes 214 may be formed in the spin housing 210, and the plurality of acoustic holes 214 may be spaced from each other in the circumferential direction of the spin housing 210. The spin housing 210 may include a plurality of bridges connecting the upper hollow body 211 and the lower hollow body 213, and the acoustic holes 214 may be formed between the bridges adjacent in the circumferential direction.

The spin cover 220 may have a plate shape as a whole, may be mounted on the upper end of the spin housing 210, and may be inserted into the spin housing 210 and coupled with the spin housing 210 inside the spin housing 210. The spin cover 220 may include an interface accommodation portion or dome 229 (see FIGS. 10 to 15) in which part of the interface 44 accommodated below the spin cover 220 is accommodated, and the interface accommodation portion 229 may protrude upward from the spin cover 220. The PCB 230 provided on the top surface of the spin cover 220, and the interface or the PCB accommodated in the space S2 may be connected by a wire, and the interface accommodation portion 229 may include a wire hole 229A (see FIGS. 10 and 11) through which such a wire passes.

Tilting shaft supporters 240 and 242 (see FIGS. 7 and 13) for rotatably supporting the tilting shaft OT may be arranged on the spin cover 220. The tilting shaft supporters 240 and 242 may be provided on the top surface of the spin cover 220. The pair of tilting shaft supporters 240 and 242 may be spaced apart in the horizontal direction, and the tilting shaft OT may be rotatably supported by the tilting shaft supporters 240 and 242 through the bearings 241 and 243.

The robot may further include the PCB 230 (see FIGS. 7 to 11) disposed on the top surface of the spin cover 220. The PCB 230 may be smaller than the spin cover 220 and may cover part of the top surface of the spin cover 220. The PCB 230 may be horizontally arranged on the top surface of the spin cover 220.

The PCB 230 may control at least one electrical component mounted on the spin cover 220. For example, the PCB 230 may be a motor control PCB for controlling the spin motor 260 and the tilting motor 360.

Figure 11:
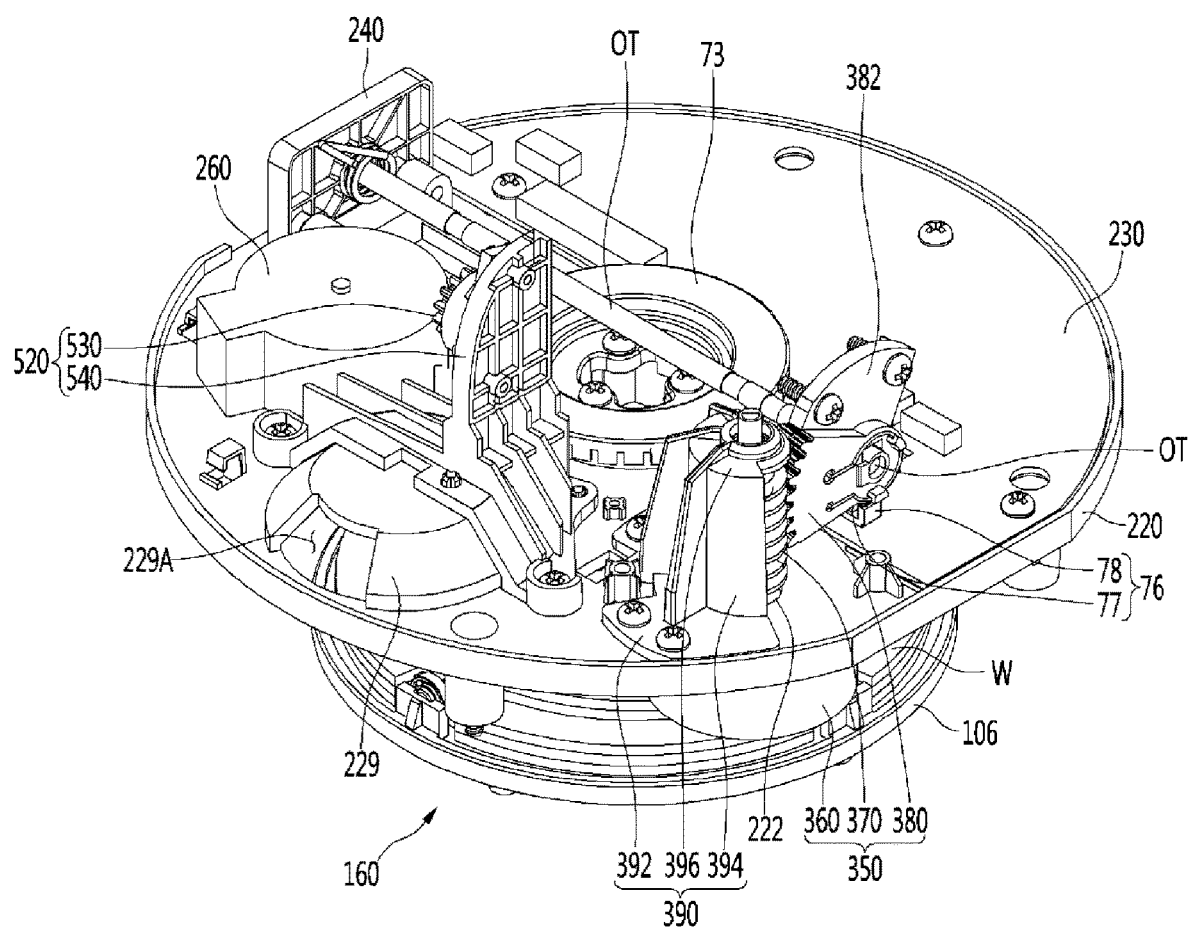
FIG. 11 is a perspective view illustrating a state in which the tilting base illustrated in FIG. 10 is separated.
Figure 12:
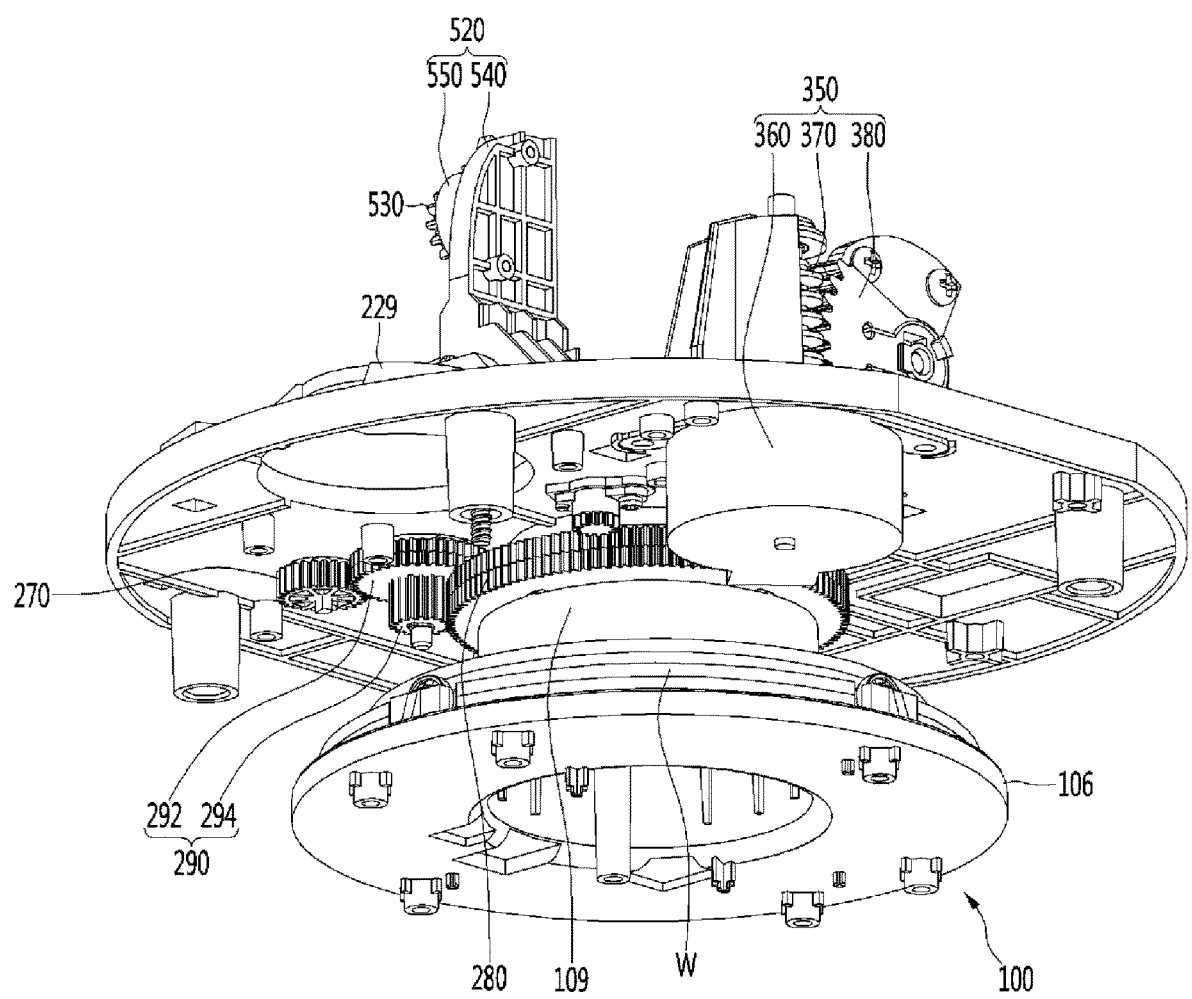
FIG. 12 is a perspective view of the base, the spin cover, and the tilting mechanism according to the embodiment, when viewed from a direction different from that of FIG. 11.
Figure 13:
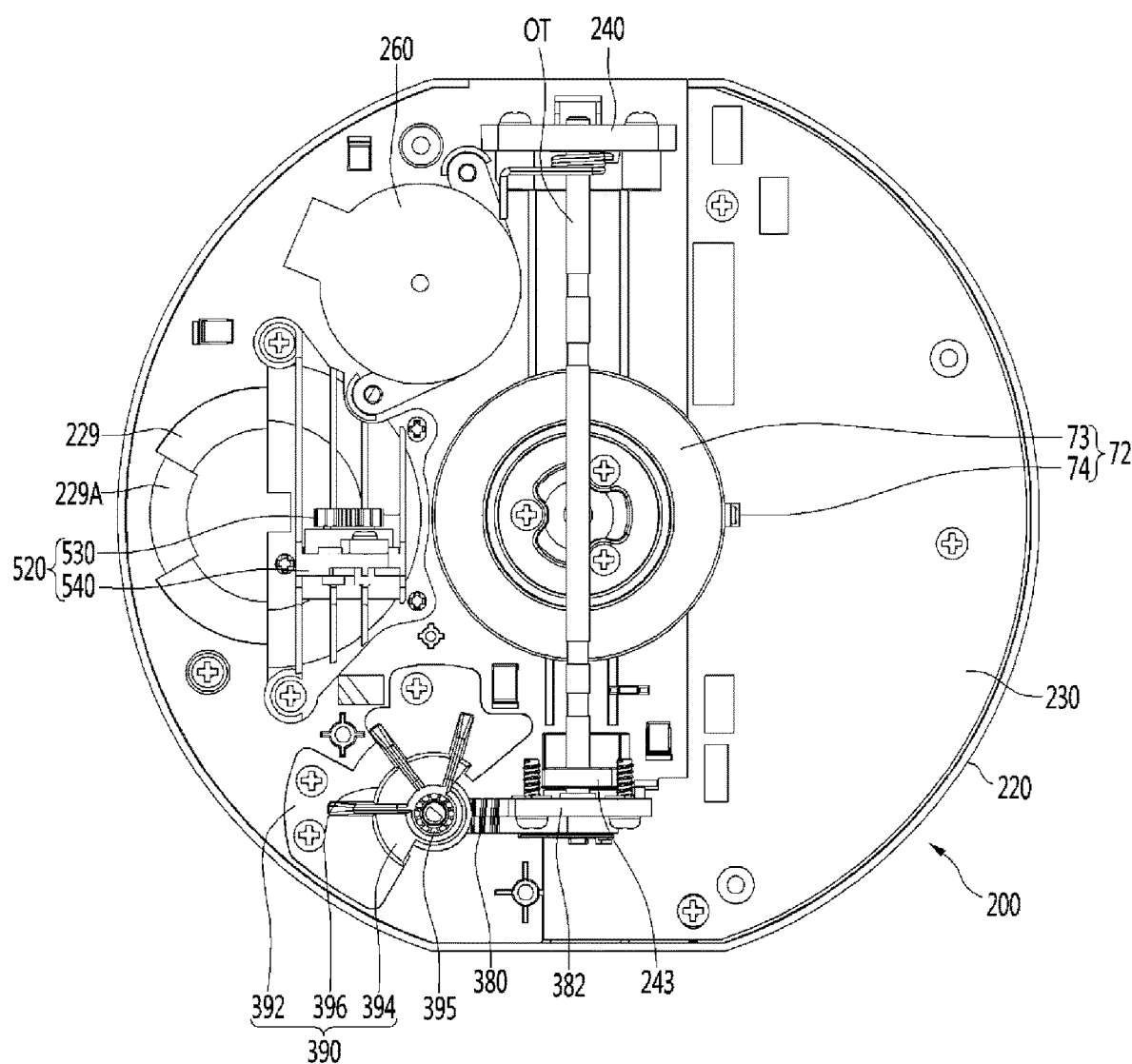
FIG. 13 is a plan view illustrating a state in which the tilting base illustrated in FIG. 10 is separated.
Figure 14:
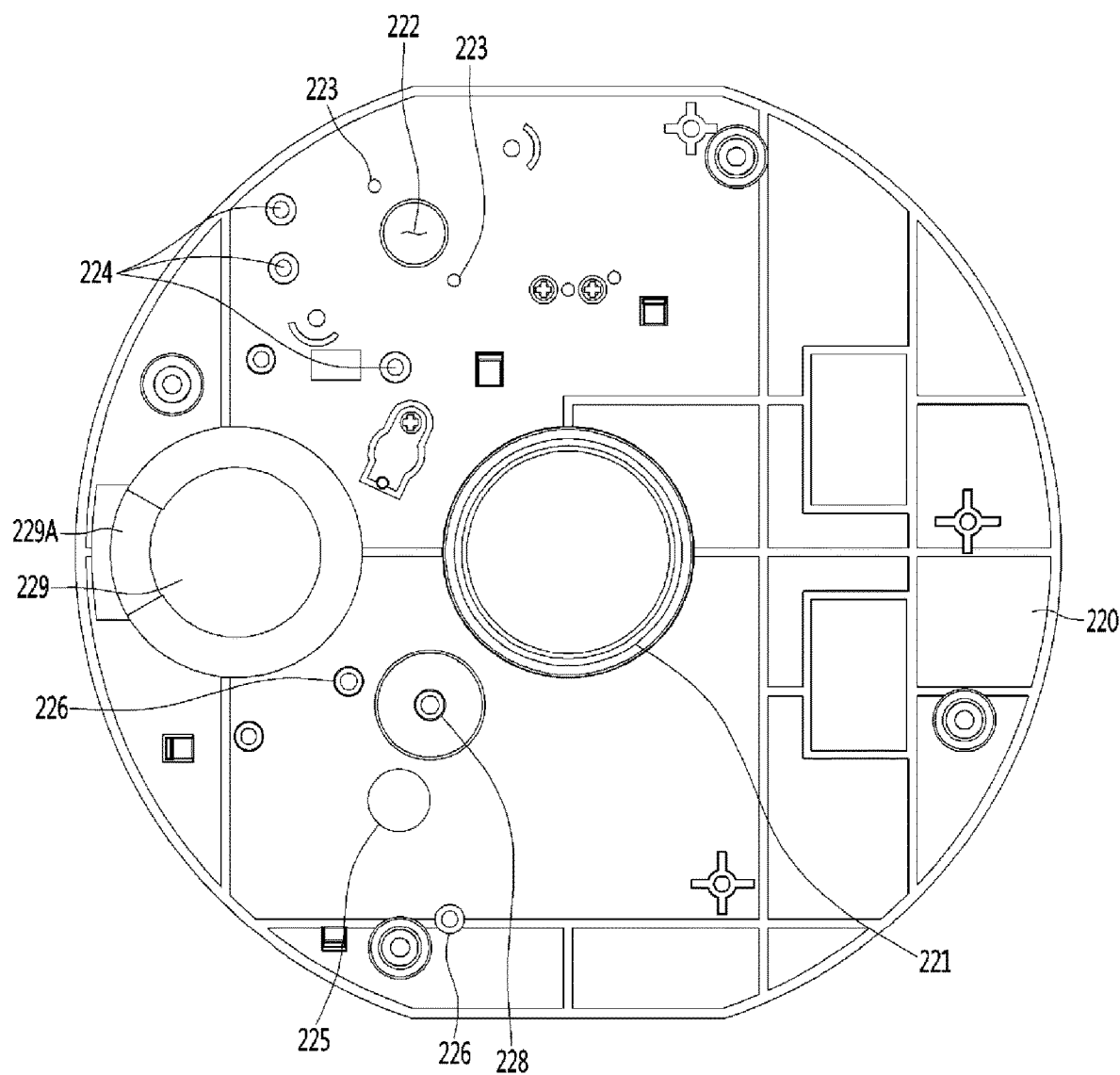
FIG. 14 is a bottom view of the spin cover according to the embodiment.

The PCB 230 may be eccentrically located on one side of the upper surface of the spin cover 220. As illustrated in FIG. 11, the spin motor 260, the tilting driving gear 370, the tilting driven gear 380, and the gear supporter 390 may be disposed on the top surface of the spin cover 220, and the PCB 230 may be eccentrically disposed at a position where the PCB 230 does not interfere with the spin motor 260, the tilting driving gear 370, the tilting driven gear 380, and the gear supporter 390.

Hereinafter, the spin mechanism 250 will be described. The spin mechanism 250 may include a spin motor 260, a spin driving gear 270, and a spin driven gear 280. The spin motor 260 may be provided in the spin cover 220, and the driving shaft may protrude from a lower portion of the spin motor 220.

The spin motor 260 may be arranged between the spin cover 220 and the tilting base 320 to be described later, and the spin motor 260 may be protected by the top surface of the spin cover 220 and the bottom surface of the tilting base 320. The spin motor 260 may be protected by the spin cover 220 and the tilting base 320.

The spin motor 260 may be provided on the top surface of the spin cover 220. The driving shaft of the spin motor 260 may be vertically arranged below the spin motor 260. The driving shaft of the spin motor 260 may protrude toward the space S2.

The spin cover 220 may include a vertical through-hole 225 (see FIG. 14) through which at least one of the driving shaft of the spin motor 260 or the spin driving gear 270 passes. At least one of the driving shaft of the spin motor 320 or the rotational shaft of the spin driving gear 270 may be provided in the through-hole 225 of the spin cover 220.

The spin cover 220 may include a spin motor fastening portion 226 (see FIG. 14) to which the tilting motor 260 is fastened. The spin motor 260 may be fastened to the spin motor fastening portion 226 provided above the spin cover 220. The spin motor 260 may be fastened to the spin cover 220 by a fastening member such as a screw. The spin motor fastening portion 226 may be a fastening boss or a fastening hole formed in the spin cover 220.

The spin driving gear 270 may be engaged with the driving shaft of the spin motor 260 in the space S2. The spin driving gear 270 may be rotated inside the spin body 200 and may be protected by the spin body 200. The spin driving gear 270 may be suspended from the driving shaft of the spin motor 260.

The spin driving gear 270 may be rotated by the spin motor 250 below the bottom surface of the spin cover 220. The spin driven gear 280 may be fixed to the base 100. The spin driven gear 280 may be a fixed gear that is fixedly mounted to the fixing shaft 109 of the base 100.

In the spin mechanism 250, the spin driving gear 270 may be engaged with the spin driven gear 280. The spin driving gear 270 may be rotated while revolving along the outer circumference of the spin driven gear 280. In the spin mechanism 250, the spin driving gear 270 may not be directly engaged with the spin driven gear 280, and the spin driving gear 270 and the spin driven gear 280 may be connected via a spin intermediate gear 290 (see FIG. 12).

The spin intermediate gear 290 may be rotatably connected to the spin cover 220. The spin cover 200 may include an intermediate gear support shaft 228 (see FIG. 14) for rotatably supporting the spin intermediate gear 290. The intermediate gear support shaft 228 may protrude downward from the bottom surface of the spin cover 220. The spin intermediate gear 290 may be accommodated in the space S2 of the spin body 200 like the spin driving gear 290.

The spin intermediate gear 290 may transmit power between the spin driving gear 270 and the spin driven gear 280. The spin intermediate gear 290 may revolve along the outer circumference of the spin driven gear 280, or may rotate about the intermediate gear support shaft 228.

Hereinafter, the tilting body 300 will be described. The tilting body 300 may include a tilting housing 310 and a tilting base 320. The tilting housing 310 may form the appearance of the robot and may be larger than the spin housing 210. A bottom surface of the tilting housing 310 may be opened. An upper space S3 may be formed inside the tilting housing 310. The upper space S3 may be a space in which the tilting base 320 is accommodated.

The tilting housing 310 may include a combination of a plurality of members, and a plurality of housings that are arranged in a longitudinal or vertical direction may be coupled to each other. The tilting housing 310 may include a first tilting housing 311 on which an interface module 400 to be described later is mounted, and a second tilting housing 312 coupled to the first tilting housing 311, and the upper space S3 may be formed between the first tilting housing 311 and the second tilting housing 312.

When the first tilting housing 311 is a front tilting housing, the second tilting housing 312 may be a rear tilting housing coupled to the rear end of the first tilting housing 311. When the first tilting housing 311 is a left tilting housing, the second tilting housing 312 may be a right tilting housing coupled to the right end of the first tilting housing 311.

The tilting housing 310 may include an opening 313 in which the interface module 400 to be described later may be mounted. The interface module 400 may be inserted into the opening 313 and disposed in the opening 313. The opening 313 of the tilting housing 310 may be formed in the first tilting housing 311. In this case, the first tilting housing 311 may be a front housing facing the human so as to communicate with the human.

The tilting base 320 may be protected by the tilting housing 310 in a state of being accommodated in the upper space S3 of the tilting housing 310. The tilting base 320 may be connected to the tilting shaft OT and rotated together with the tilting shaft OT. A tilting shaft connecting portion or bracket 321, to which the tilting shaft OT is connected, may be formed in or on the tilting base 320. The tilting shaft connecting portion 321 may elongated in the horizontal direction at the lower portion of the tilting base 320.

The tilting shaft OT may be elongated in the tilting base 320 in the horizontal direction. The tilting shaft OT may be connected to the tilting base 320, and the tilting base 320 may be coupled to the tilting housing 310. During the rotation of the tilting shaft OT, the tilting base 320 and the tilting housing 310 may tilt while rotating together about the tilting shaft OT.

The tilting housing 310 may be connected to the tilting base 320, and may tilt about the tilting shaft OT while rotating together with the tilting base 320 during the rotation of the tilting base 320. A tilting base coupling portion or coupler 314 (see FIG. 8), to which the tilting base 320 is coupled, may be formed on the inner surface of the tilting housing 310. The connecting portion (or rib) 324 (see FIG. 8), into which the tilting base connecting portion 314 is inserted and fitted, may be formed in the tilting base 320.

The tilting base coupler 314 may include a pair of ribs spaced apart from each other by an interval corresponding to the thickness of the connecting portion 324 such that the connecting portion 324 is inserted and fitted thereinto. The connecting portion 324 may be formed at part of the outer circumference of the tilting base 320 and may be inserted between one pair of ribs.

The tilting housing 310 may include a tilting base 320 and a tilting base mounter 315 (see FIG. 8) fastened by a fastening member such as a screw. The tilting base 320 may include a fastening portion or boss 325 (see FIG. 8) configured to be fastened to the tilting base mounter 315 by a fastening member such as a screw.

The tilting base mounter 315 may protrude from the tilting housing 310 toward the upper space S3. The fastening portion 325 may include a fastening boss for fastening the fastening member such as the screw. The fastening portion 325 may be formed on an opposite side of the tilting base 320 to the connecting portion 324.

One of the tilting base coupler 314 and the tilting base mounter 315 may be formed in the first tilting housing 311, and the other of the tilting base coupler 314 and the tilting base mounter 315 may be formed on the second tilting housing 313. The tilting base 320 may be provided across the upper space S3 formed inside the tilting housing 310.

The tilting base coupler 314 and the tilting base mounter 315 may be formed on the inner lower portion of the tilting housing 310. In this case, the tilting base 320 may be provided across the inner lower portion of the tilting housing 310, and the lower strength of the tilting housing 310 may be reinforced.

When the tilting housing 310 includes the first tilting housing 311 and the second tilting housing 312, the bottom surface of the tilting housing 310 may be opened, and the tilting base 320 may be coupled to the upper portion of the tilting housing 310, the lower portion of the tilting housing 310 may have weak strength, and the lower portion of the tilting housing 310 may bend or shake during the spinning or tilting of the tilting body 300. However, as described above, when the tilting base 320 is coupled to the lower portion of the tilting housing 310, the bending or shaking of the lower portion of the tilting housing 310 may be minimized.

The tilting body 300 may further include a tilting supporter 330 for supporting the tilting housing 310. The tilting supporter 330 may reinforce the strength of the tilting housing 310. The strength of the tilting housing 310 may be reinforced by connecting weak portions of the tilting housing 310 to each other.

The strength of the tilting housing 310 around the opening 313 may be relatively weak and the tilting supporter 330 may connect the periphery of the opening 313. When the opening 313 is formed in the first tilting housing 311, the tilting supporter 330 may connect the upper periphery of the opening 313 and the lower periphery of the opening 313 in the first tilting housing 311. The tilting supporter 330 may also be connected to the upper portion of the second tilting housing 312.

The tilting supporter 330 may have a frame shape, and may be provided in the upper space S3 of the tilting housing 310 to function as a frame for supporting the tilting housing 310. The tilting supporter 330 may be provided on the tilting base 320. In this case, the tilting base 320 may be a lower reinforcing member for reinforcing the lower strength of the tilting housing 310, and the tilting supporter 330 may be an upper reinforcing member for reinforcing the upper strength of the tilting housing 310. The overall strength of the tilting housing 310 may be maintained by the tilting base 320 and the tilting supporter 330, and the tilting housing 310 may be operated with a sense of stability during the spinning or tilting of the tilting housing 310.

The upper end 310A of the tilting housing 310 may be higher than the upper end 210A of the spin housing 210, and the tilting housing 310 may cover the upper end 210A of the spin housing 210. The lower end 310b of the tilting housing 310 may be lower than the upper end 210A of the spin housing 210 and may be higher than the lower end 201B of the spin housing 210, and the tilting housing 310 may shield part of the outer circumference of the spin housing 210.

The tilting housing 310 may include a gap shielding portion (or gap shield) 310C (see FIG. 8) shielding a gap G1 (see FIG. 8) between the tilting base 310 and the spin cover 210. The inner surface of the gap shielding portion 310C of the tilting housing 310 may face the gap G1 between the spin cover 210 and the tilting base 310, and shield the gap G1 from the outside of the gap G1.

When the tilting housing 310 includes the gap shielding portion 310C, various components (for example, the spin motor 260, the tilting driving gear 370, the tilting driven gear 380, and the PCB 230) located between the tilting base 310 and the spin cover 210 may be protected by the gap shielding portion 310.

The lower portion of the tilting housing 310 may surround the outer circumferential surface of the spin housing 210. The lower portion of the tilting housing 310 may overlap a portion including the upper end 210A of the spin housing 210 in the horizontal direction, and the upper end 210A of the spin housing 210 may be hidden by the tilting housing 310 so as not to be seen from the outside.

The robot may have a size and a shape defining a gap G2 between the tilting housing 310 and the spin housing 210. The gap G2 may be formed between the inner circumferential surface of the tilting housing 310 and the outer circumferential surface of the spin housing 210.

The lower portion of the tilting housing 310 may have a shape in which the inner diameter thereof gradually decreases toward the lower side, and a part including the lower end 310B of the tilting housing 310 may overlap the spin housing 210 in the vertical and horizontal directions. To this end, the lower end inner diameter D1 of the tilting housing 310 may be smaller than the upper end outer diameter D2 of the spin housing 210 and larger than the lower end outer diameter D3 of the spin housing 210.

The portion of the tilting housing 310 that overlaps the spin housing 210 in the vertical direction and the horizontal direction may be referred to as a spin housing shielding portion 310D that shields the spin housing 210. When the tilting housing 310 includes the spin housing shielding portion 310D, foreign matter such as dust placed on the outside of the robot may be restricted from penetrating into the inside of the robot through the gap G2 in the spin housings 210 of the tilting housing 310.

Hereinafter, the tilting mechanism 350 will be described. The tilting mechanism 350 may include a tilting motor 360 accommodated in the space S2, a tilting driving gear 370 elongated in a direction intersecting with the tilting shaft OT and having a lower portion connected to the tilting motor 360, and a tilting driven gear 380 connected to the tilting shaft OT or the tilting body 300 and engaged with the tilting driving gear 370 above the spin cover 220.

The tilting motor 360 may be arranged below the spin cover 220 while being accommodated in the space S2. The tilting driven gear 380 may be provided above the spin cover 220. The tilting motor 360 and the tilting driven gear 380 may be connected through the tilting driving gear 370 with the spin cover 220 interposed therebetween.

The spin cover 220 may include a vertical through-hole 222 (see FIGS. 10, 11, and 14) through which at least one of the driving shaft of the tilting motor 360 or the tilting driving gear 370 passes. At least one of the driving shaft of the tilting motor 360 or the rotational shaft of the tilting driving gear 370 may be provided in the through-hole 222 of the spin cover 220.

The spin cover 220 may include a tilting motor fastening portion 223 (see FIG. 14) to which the tilting motor 360 is fastened. The tilting motor 360 may be fastened to the tilting motor fastening portion 223 provided below the spin cover 220. The tilting motor 360 may be fastened to the spin cover 220 by a fastening member such as a screw. The tilting motor fastening portion 223 may be a fastening boss or a fastening hole formed in the spin cover 220.

The driving shaft of the tilting motor 360 may extend in a direction intersecting with the tilting shaft OT. The tilting shaft OT may extend in the horizontal direction, and the tilting motor 360 may be mounted on the spin cover 220 with the driving shaft extending in the vertical direction.

The driving shaft of the tilting motor 360 may be parallel to the driving shaft of the spin motor 260. The driving shaft of the tilting motor 360 and the driving shaft of the spin motor 260 may extend in the vertical direction, and the driving shaft of the tilting motor 360 and the driving shaft of the spin motor 260 may be spaced from each other in the horizontal direction.

The tilting driving gear 370 may be rotated by the tilting motor 360. The tilting driving gear 370 may be a worm gear oriented vertically. The worm gear that is the tilting driving gear 370 may be vertically oriented on the tilting cover 220 in a state of being connected to the tilting motor 360.

The tilting driving gear 370 may include a gear portion having gear teeth formed on an outer circumference thereof, a lower rotational shaft protruding from the lower side of the gear portion, and an upper rotational shaft protruding from the upper side of the gear portion. The gear portion of the tilting driving gear 370 may be disposed above the through-hole 222 and may be engaged with the tilting driven gear 380 provided at the periphery of the gear portion.

The lower rotational shaft that is the lower end of the tilting driving gear 370 may be connected to the tilting motor 360, and the upper rotational shaft that is the upper end of the tilting driving gear 370 may be rotatably supported by the gear supporter 390. The tilting driven gear 380 may be connected to at least one of the tilting shaft OT or the tilting body 300 such that the tilting driven gear 380 is rotatable at the outside of the space S2 of the spin body 200.

The tilting driven gear 380 may be a spur gear that rotates about the tilting shaft OT. The tilting driven gear 380 may be connected to at least one of the tilting shaft OT or the tilting base 320 so as to rotate the tilting body 300.

The tilting driven gear 380 may be connected to the tilting body 300, particularly, the tilting base 320, so as to rotate the tilting base 320 about the tilting shaft OT. The tilting driven gear 380 may include a tilting base fastening portion 382 (see FIG. 11) that can be fastened to the tilting base 320 by a fastening member such as a screw. The robot may further include a gear supporter 390 mounted on the spin cover 220 and connected to the upper portion of the tilting driving gear 360.

The spin cover 220 may include a gear supporter fastening portion 224 (see FIG. 14) to which the gear supporter 390 is fastened. The gear supporter 390 may be fastened to the spin cover 220 by a fastening member such as a screw, and the gear supporter fastening portion 224 may be a fastening boss or a fastening hole formed in the spin cover 220.

Figure 10:
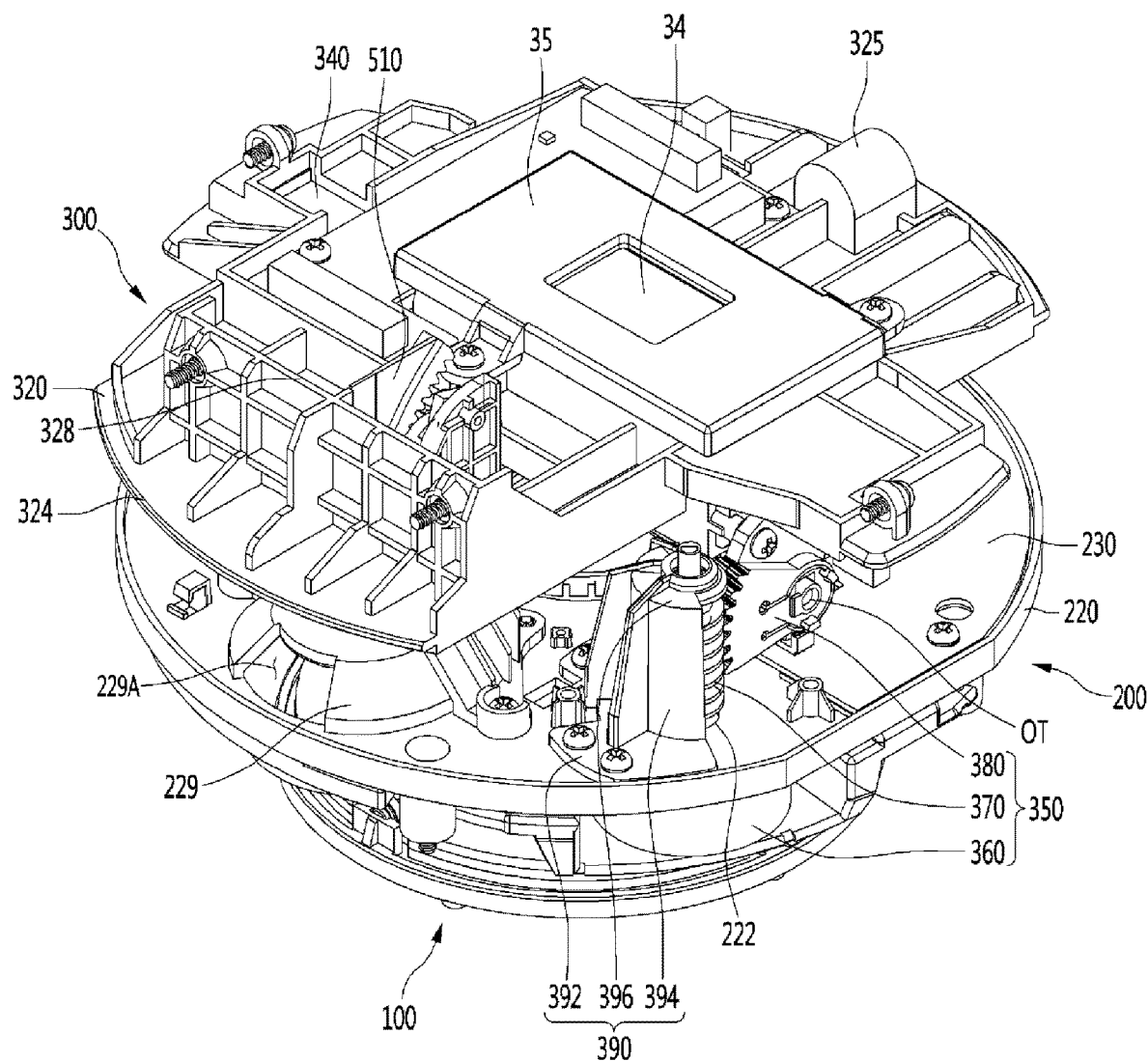
FIG. 10 is a perspective view illustrating a base, a spin cover, a tilting mechanism, and a tilting base according to an embodiment.

As illustrated in FIGS. 10 and 11, the gear supporter 390 may include a lower fastening portion 392 fastened to the spin cover 220 by a fastening member such as a screw, a rotational shaft supporting portion 394 rotatably supporting the upper portion of the tilting driving gear 370, and a connecting portion 396 connecting the lower fastening portion 392 and the rotational shaft supporting portion 394. A bearing 395 (see FIG. 13) for rotatably supporting the upper rotational shaft of the tilting driving gear 370 may be provided inside the rotational shaft support portion 394, and the rotational shaft support portion 394 may rotatably support the upper rotational shaft of the tilting driving gear 370 by the bearing 394.

The connecting portion 396 may surround part of the outer circumference of the tilting driving gear 370, particularly, the gear portion. A space for accommodating the tilting driving gear 370 may be formed in the connecting portion 396. The connecting portion 396 may protect the tilting driving gear 370 from the opposite side of the tilting driven gear 380. The tilting driving gear 370 may rotate about the vertical shaft in a state of being accommodated in the space formed inside the connecting portion 396.

For another example, the interface of the robot may be tiltable together with the tilting body 300. The display 42, the camera 54, and the microphone 56 may be mounted on the tilting body 300 and rotated together with the tilting body 300 when the spin body 200 rotates, and may be tilted together with the tilting body 300 when the tilting body 300 is tilted.

The robot may further include an interface module 400 installed in the tilting body 300. The interface module 400 may include interfaces other than the interfaces accommodated in the space S2, and at least one interface constituting the interface module 400 may be the display 42, the camera 54, the microphone 56, or the like.

Figure 8:
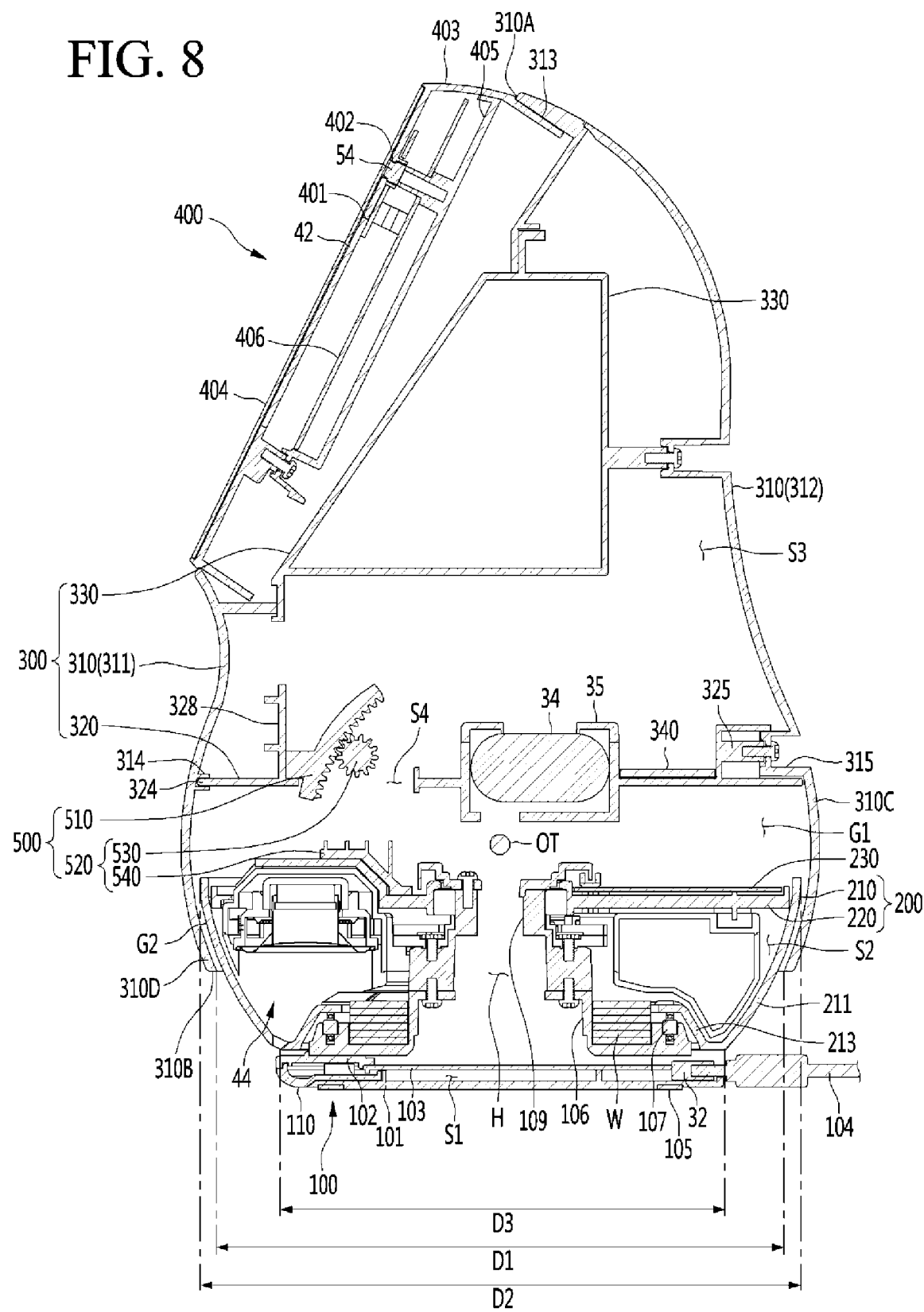
FIG. 8 is a cross-sectional view taken along line A-A' of FIG. 4.

Referring to FIG. 8, the interface module 400 may include an interface case 403 mounted on the tilting body 300 and having openings 401 and 402 formed therein, a front cover 404 disposed on the front surface of the interface case 403 and covering the openings 401 and 402, and a back cover 405 coupled to the interface case 403. The back surface of the interface case 403 may be opened, and the openings 401 and 402 may be formed on the front surface of the interface case 403.

The front cover 404 may cover the front surface of the interface case 404. The back cover 405 may be provided inside the interface case 403 and may be fastened to the interface case 403 by a fastening member such as a screw. The interface module 400 may further include an interface PCB 406 disposed in the back cover 405.

The display 42 constituting the interface of the present disclosure may be arranged between the interface PCB 406 and the front cover 404 to constitute the interface module 400. All or part of the display 42 may be accommodated in one opening 401 among the openings 401 and 402 and may output an image through the front cover 404.

The camera 54 constituting the interface of the present disclosure may be provided between the back cover 406 and the front cover 404. All or part of the camera 54 may be accommodated in the other opening 402 among the openings 401 and 402 and may capture an image through the front cover 404. The interface of the present embodiment may be mounted on the tilting housing 310.

When the backlash of the gears constituting the spin mechanism 250 or the tilting mechanism 350 is small, a gear stuck may be generated. When the backlash of the gears is too large, unnecessary shaking may occur when the spin body 200 is rotated or when the tilting body 300 is tilted. The robot may further include a damping mechanism 500 that can minimize the shaking due to the backlash of the gears when the tilting body 300 is operated.

Figure 7:
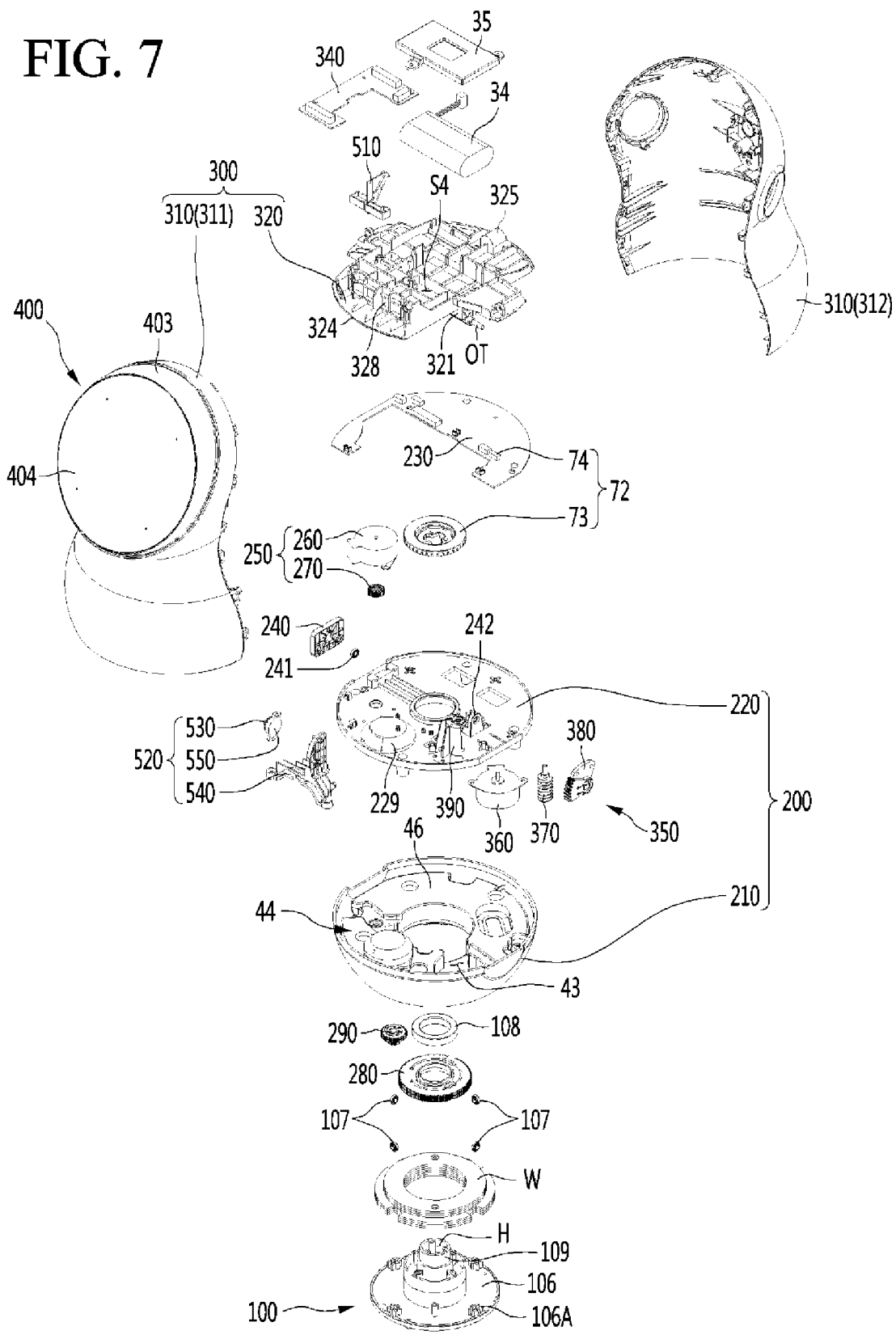
FIG. 7 is an exploded perspective view of the robot according to the embodiment.

As illustrated in FIGS. 7 and 8, the damping mechanism 500 may include a tilting gear 510 and a damper 520. The damper 520 may include a damping gear 530 with which the tilting gear 510 is engaged to guide the tilting of the tilting gear 510. The damper 520 may further include a damping gear supporter (or damping gear bracket) 540 mounted on the spin body 200 to support the damping gear 540.

The tilting gear 510 may have a shape in which the surface on which the gear teeth are formed is concave. The tilting gear 510 may surround part of the damping gear 530. The tilting gear 510 may be tilted along the outer circumference of the damping gear 530 when the tilting body 300 is tilted. The tilting gear 510 may be mounted on the tilting base 320 of the tilting body 300. A tilting gear supporter (or tilting gear bracket) 328 (see FIG. 8) for supporting the tilting gear 510 such that the tilting gear 510 is in close contact with the damping gear 530 may be formed on the tilting body 320.

The tilting body 300, particularly, the tilting base 320, may include a gear accommodation space S4 in which the tilting gear 510 and the damping gear 530 are accommodated. The damping gear 530 may be provided in the gear accommodation space S4 according to the tilting angle of the tilting base 320, or may be provided above or below the gear accommodation space S4 according to the tilting angle of the tilting base 320. To this end, the gear accommodation space S4 may be larger than the damping gear 530 in the tilting base 320.

The central axis of the damping gear 530 may be parallel to the tilting shaft OT. The damping gear 530 may be arranged such that the distance between the central axis of the damping gear 530 and the tilting shaft OT is shorter than the distance between the tilting shaft OT and the tilting gear 510. The damping gear 530 may be provided between the tilting shaft OT and the tilting gear 510 so as to be engaged with the tilting gear 510 and spaced apart from the tilting shaft OT. The damping gear 530 may be arranged such that the central axis of the damping gear 530 is higher than the tilting shaft OT. The radius of curvature of the damping gear 530 may be less than the radius of curvature of the tilting gear 510.

The damping gear 530 may be rotatably connected to the damping gear supporter 540. In this case, the damping gear 530 may guide the tilting of the tilting gear 510 while being rotated about the central axis thereof.

The damping mechanism 500 is not limited to the structure in which the damping gear 530 is rotatably connected to the damping gear supporter 540. The damping mechanism 500 may further include a damper body 550 mounted on the damping gear supporter 540 and having a damping gear rotatably connected thereto.

The damper body 550 may be mounted on the upper portion of the damping gear supporter 540 as a fastening member such as a screw or a hook portion such as a hook, and the damping gear 530 may be connected to the damper body 550. The damper body 550 may rotatably support the damping gear 530, and the damper body 550 may support the damping gear 530 such that the damping gear 530 is in close contact with the tilting gear 510.

A spring may be provided inside the damper body 550. The spring provided inside the damper body 550 may elastically support the damping gear 530. A first end of the spring provided inside the damper body 550 may be connected to the central axis of the damping gear 530, and a second end of the spring may be connected to the damper body 550. Such a spring may be a coil spring, a torsion spring, or a leaf spring, and may elastically support the damping gear 530 when the damping gear 530 is rotated.

The damping gear supporter 540 may be mounted on the spin body 200. The lower portion of the damping gear supporter 540 may be fastened to the spin body 200 by a fastening member such as a screw or a hook portion such as a hook. In the damping mechanism 500, when the tilting gear 510 is tilted along the outer circumference of the damping gear 530 during the tilting of the tilting body 300, the damping mechanism 500 may buffer unintentional shaking of the tilting gear 510 and the tilting body 300, and the tilting gear 510 and the tilting body 300 may be more smoothly operated. The damping mechanism 500 may decelerate the tilting body 300 so as to help the tilting body 300 to tilt more smoothly when the tilting body 300 is tilted.

In the robot, the battery 34 may be mounted on at least one of the base 100, the spin body 200, the tilting body 300, or the interface module 400. The battery 34 may be mounted in a configuration as low as possible among various configurations of the robot, and may be close to the spin motor 260, the tilting motor 360, and the interface module 400.

The battery 34 may be provided with the spin axis OS as much as possible. When the battery 34 is positioned eccentrically to the robot, the weight center of the robot may be eccentric to one side of the robot by the weight of the battery 34, and thus the battery 34 may be provided as close as possible to the spin axis OS or as close as possible to the spin shaft OS.

The battery 34 may be mounted in a configuration in which the height of the robot is relatively low and may be provided on the spin axis OS. To this end, the battery 34 may be provided on the tilting base 320. The tilting base 320 may include a pocket into which the battery 34 is inserted and accommodated. The battery cover 35 (see FIG. 8) may be coupled to the tilting base 320 so as to prevent the battery 34 accommodated in the pocket from being removed.

The spin angle detection unit 72 may include a slit body 73 disposed on the fixed shaft 109 and having at least one slit, as illustrated in FIG. 9. The spin angle detection unit 72 may further include an optical sensor 74, and the optical sensor 74 may include a light emitting portion 74A for emitting light toward the slit body 73 and a light receiving portion 74B for receiving light passing through the slit of the slit body 73 after being emitted by the light emitting portion 74A.

The tilting angle detection unit 76 may include a slit body 77 provided on the tilting driven gear 380 and having at least one slit, as illustrated in FIG. 11. The tilting angle detection unit 76 may further include an optical sensor 78, and the optical sensor 78 may include a light emitting portion for emitting light toward the slit body 77 of the tilting driven gear 380, and a light receiving portion for receiving light passing through the slit of the slit body 77 after being emitted by the light emitting portion.

Both the optical sensor 74 of the spin angle detection unit 72 and the optical sensor 78 of the tilting angle detection unit 76 may be mounted on the PCB 230 provided on the spin cover 220, and the PCB 230 provided on the spin cover 220 may control the spin motor 260 mounted on the spin cover 220 and the tilting motor 360 according to the value detected by these optical sensors 74 and 78.

Embodiments provide a robot capable of smoothly tilting a tilting body while minimizing the shaking or tremble of the tilting body.

In one embodiment, a robot may include: a base; a spin body rotatably disposed in the base; a spin mechanism rotating the spin body around the base; a tilting body tiltably supported to the spin body around a tilting axis; a tilting mechanism tilting the tilting body around the tilting axis; an interface installed in at least one of the spin body and the tilting body; a tilting gear mounted on the tilting body and tilted together with the tilting body; and a damper mounted on the spin body, wherein the damper may include a damping gear engaged with the tilting gear and guiding tilting of the tilting gear, and the tilting gear is tilted along an outer circumference of the damping gear.

A central axis of the damping gear and the tilting axis may be parallel to each other. A distance between a central axis of the damping gear and the tilting axis may be smaller than a distance between the tilting axis and the tilting gear. The damping gear may be disposed so as to be engaged with the tilting gear between the tilting axis and the tilting gear.

A central axis of the damping gear may be higher than the tilting axis. A curvature radius of the damping gear may be smaller than a curvature radius of the tilting gear. The tilting gear may have a shape in which a surface on which gear teeth are formed is concavely recessed.

The tilting mechanism may include: a tilting motor mounted on the spin body; a tilting driving gear configured to be rotated by a tilting motor; and a tilting driven gear connected to the tilting axis or the tilting body. The tilting body may include: a tilting base to which the tilting axis is connected; and a tilting housing connected to the tilting base and defining an upper space in which the tilting base is accommodated. The tilting gear may be mounted on the tilting base, and the interface may be mounted on the tilting housing.

The tilting base may include a tilting gear supporter supporting the tilting gear such that the tilting gear is in closely contact with the damping gear. The damper may further include a damping gear supporter mounted on the spin body and supporting the damping gear. The damper may further include a damper body which is mounted on the damping gear supporter and to which the damping gear is rotatably connected.

A gear accommodation space in which the tilting gear and the damping gear are accommodated may be formed in the tilting body. The gear accommodation space may be formed to be larger than the damping gear.

The details of one or more embodiments are set forth in the accompanying drawings and the description below. Other features will be apparent from the description and drawings, and from the claims.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a base;
a first body provided above the base;
spin gearing configured to rotate the first body with respect to the base;
a second body provided above the first body;
tilt gearing configured to tilt the second body about a tilting axis;
an interface accommodated in at least one of the first body and the second body;
a first gear connected to the second body and configured to rotate together with the second body; and
a damper mounted on the first body,
wherein the damper comprises a second gear engaged with the first gear and configured to rotate with the first gear, and the first gear is rotated about an outer circumference of the second gear,
wherein the first gear and the second gear are spaced apart from the tilting axis,
wherein the second gear is configured to be engaged with the first gear between the tilting axis and the first gear,
wherein the tilt gearing includes:
a first motor mounted on the first body;
a first driving gear configured to be rotated by the first motor; and
a first driven gear connected to the second body or a shaft about which the second body tilts, and
wherein a distance between a rotation axis of the second gear and the tilting axis is smaller than a distance between the tilting axis and the first gear.

2. The robot according to claim 1, wherein a rotation axis of the second gear and the tilting axis are parallel to each other.

3. The robot according to claim 1, wherein a rotation axis of the second gear is higher than the tilting axis.

4. The robot according to claim 1, wherein a curvature radius of the second gear is smaller than a curvature radius of the first gear.

5. The robot according to claim 1, wherein the first gear is an internal sector gear.

6. The robot according to claim 1, wherein the second body comprises:

a second body base to which a shaft about which the second body tilts is connected; and
a second body housing connected to the second body base and defining a first space in which the second body base is accommodated.

7. The robot according to claim 6, wherein the first gear is mounted on the second body base, and the interface is mounted on the second body housing.

8. The robot according to claim 7, wherein the second body base comprises a first gear bracket that supports the first gear such that the first gear is meshed with the second gear.

9. The robot according to claim 1, wherein the damper further comprises a second gear bracket mounted on the first body and configured to support the second gear.

10. The robot according to claim 9, wherein the damper further comprises a damper body which is mounted on the second gear bracket and to which the second gear is rotatably connected.

11. The robot according to claim 9, wherein a gear accommodation space in which the first gear and the second gear are accommodated is formed in the second body.

12. The robot according to claim 11, wherein the gear accommodation space is larger than the second gear.

13. A robot comprising:
a base;
a first body provided above the base and configured to be rotatable with respect to the base;
a second body provided above the first body and configured to be tiltable with respect to the first body and the base about a tilting axis;
a gearing configured to tilt the second body about the tilting axis;
a damper provided in the second body,
wherein the damper includes:
a first gear attached to the second body;
a second gear attached to the first body and meshed with the first gear; and
a spring having a first end attached to the second gear and a second end attached to the first body,
wherein the gearing includes:
a first motor mounted on the first body;
a first driving gear configured to be rotated by the first motor; and
a first driven gear connected to the second body or a shaft about which the second body tilts,
wherein the first gear and the second gear are spaced apart from the tilting axis,
wherein the second gear is configured to be engaged with the first gear between the tilting axis and the first gear, and
wherein a distance between a rotation axis of the second gear and the tilting axis is smaller than a distance between the tilting axis and the first gear.

14. The robot according to claim 13, wherein the first gear is an internal sector gear configured to be stationary with respect to the second body, and the second gear is configured to rotate with respect to the first body.

15. The robot according to claim 14, wherein a rotation axis of the second gear is parallel to an axis about which the second body tilts.

16. The robot according to claim 15, wherein the rotation axis of the second gear is higher than the axis about which the second body tilts.

17. The robot according to claim 16, further comprising an interface provided on the second body, wherein the interface is configured to output information.

18. The robot according to 13, wherein the second body includes a cavity to receive the first gear and the second gear.

\* \* \* \* \*